US012638956B2

(12) United States Patent
Yoshida

(10) Patent No.: US 12,638,956 B2
(45) Date of Patent: May 26, 2026

(54) INFORMATION PROCESSING APPARATUS, OPERATION METHOD OF INFORMATION PROCESSING APPARATUS, AND OPERATION PROGRAM OF INFORMATION PROCESSING APPARATUS

(71) Applicant: FUJIFILM Corporation, Tokyo (JP)

(72) Inventor: Masako Yoshida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/468,326

(22) Filed: Sep. 15, 2023

(65) Prior Publication Data

US 2024/0004523 A1 Jan. 4, 2024

Related U.S. Application Data

(63) Continuation of application No. PCT/JP2022/003922, filed on Feb. 2, 2022.

(30) Foreign Application Priority Data

Mar. 30, 2021 (JP) ................................ 2021-057321

(51) Int. Cl.
*G06F 3/0482* (2013.01)

(52) U.S. Cl.
CPC .................................. *G06F 3/0482* (2013.01)

(58) Field of Classification Search
IPC .................... G06F 3/0484,3/01, 15/16, 16/335, G06F 17/00, 3/048, 3/0488, 3/0485, 16/9535,
(Continued)

(56) References Cited

U.S. PATENT DOCUMENTS 7,636,733 B1 * 12/2009 Rothmuller ............ G06Q 10/10
707/999.005
2006/0227223 A1 10/2006 Nagata
(Continued)

FOREIGN PATENT DOCUMENTS

JP 2006-072481 A 3/2006
JP 2006-129371 A 5/2006
(Continued)

OTHER PUBLICATIONS

International Search Report issued in PCT/JP2022/003922; mailed May 17, 2022.
(Continued)

*Primary Examiner* — Rayeez R Chowdhury
(74) *Attorney, Agent, or Firm* — Studebaker Brackett PLLC

(57) ABSTRACT

Provided are an information processing apparatus, an operation method of an information processing apparatus, and an operation program of an information processing apparatus capable of thinking about an event of the future more specifically while looking back on the past memories. A CPU of a user terminal includes a screen generation unit and a screen output unit. The screen generation unit generates an image list screen in which images possessed by a user are arranged in time series. In this case, the screen generation unit disposes a future event image, which is an image of an event of future related to the user, in a future event display region, which is a future region in a time-series arrangement direction with respect to a latest image among the images. The screen output unit displays and outputs the image list screen on a display.

9 Claims, 19 Drawing Sheets

(58) Field of Classification Search
IPC .......................... 3/0481, 3/0482, 16/957, 11/14, 12/0862, 12/0868, 16/901, 16/2455, 16/906, 3/04817, 3/04842, 3/04845, 1/16, 15/02, 16/00, 16/90, 3/00, 7/00, 9/451, 13/14, 16/28, 16/29, 16/31, 16/35, 16/438, 16/44, 16/951, 16/9537, 16/954, 16/955, 21/31, 21/62, 3/04847, 40/205
See application file for complete search history.

(56) References Cited

U.S. PATENT DOCUMENTS

| | | | | |
|---|---|---|---|---|
| 2008/0175103 | A1 * | 7/2008 | Nakamura | G06Q 10/109 368/10 |
| 2012/0051644 | A1 * | 3/2012 | Das | G06V 20/30 382/190 |
| 2012/0265758 | A1 | 10/2012 | Han et al. | |
| 2013/0257859 | A1 | 10/2013 | Sato et al. | |
| 2014/0013253 | A1 * | 1/2014 | Kobayashi | G06F 16/58 715/764 |
| 2014/0111641 | A1 * | 4/2014 | Counts, Jr. | H04M 1/72439 348/207.1 |
| 2014/0152833 | A1 * | 6/2014 | Itoi | G06Q 30/0269 348/157 |
| 2015/0128071 | A1 * | 5/2015 | Yang | H04L 12/1813 715/753 |
| 2015/0288779 | A1 * | 10/2015 | Okumura | H04L 67/10 709/219 |

FOREIGN PATENT DOCUMENTS

| | | | |
|---|---|---|---|
| JP | 2006-211257 | A | 8/2006 |
| JP | 2006-245832 | A | 9/2006 |
| JP | 2013-084282 | A | 5/2013 |
| JP | 2013-210868 | A | 10/2013 |
| JP | 2015-090705 | A | 5/2015 |
| JP | 2019-128613 | A | 8/2019 |

OTHER PUBLICATIONS

International Preliminary Report On Patentability (Chapter I) and Written Opinion of the International Searching Authority issued in PCT/JP2022/003922; issued Oct. 3, 2023.

The extended European search report issued by the European Patent Office on Aug. 16, 2024, which corresponds to European Patent Application No. 22779484.9-1218 and is related to U.S. Appl. No. 18/468,326.

An Office Action; "Notice of Reasons for Refusal," mailed by the Japanese Patent Office on Aug. 5, 2025, which corresponds to Japanese Patent Application No. 2023-510555 and is related to U.S. Appl. No. 18/468,326; with English language translation.

Office Action issued in CN 202280023395.X; mailed by the State Intellectual Property Office of the People's Republic of China on Nov. 19, 2025.

"Notice of Reasons for Refusal" Office Action issued in JP 2023-510555; mailed by the Japanese Patent Office on Dec. 16, 2025.

* cited by examiner

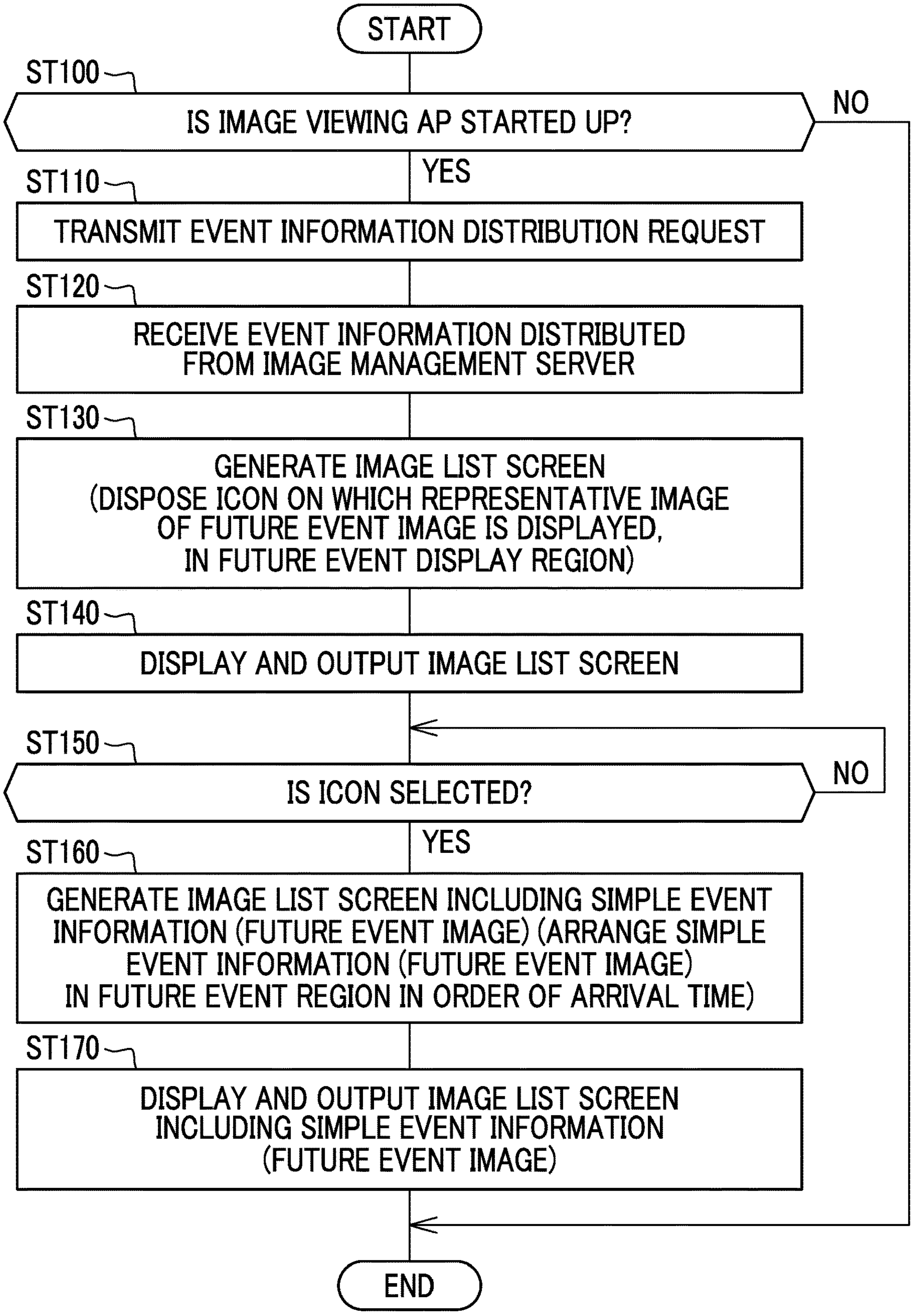

FIG. 15

START

ST100

IS IMAGE VIEWING AP STARTED UP?     NO

YES

ST110

TRANSMIT EVENT INFORMATION DISTRIBUTION REQUEST

ST120

RECEIVE EVENT INFORMATION DISTRIBUTED
FROM IMAGE MANAGEMENT SERVER

ST130

GENERATE IMAGE LIST SCREEN
(DISPOSE ICON ON WHICH REPRESENTATIVE IMAGE
OF FUTURE EVENT IMAGE IS DISPLAYED,
IN FUTURE EVENT DISPLAY REGION)

ST140

DISPLAY AND OUTPUT IMAGE LIST SCREEN

ST150

IS ICON SELECTED?     NO

YES

ST160

GENERATE IMAGE LIST SCREEN INCLUDING SIMPLE EVENT
INFORMATION (FUTURE EVENT IMAGE) (ARRANGE SIMPLE
EVENT INFORMATION (FUTURE EVENT IMAGE)
IN FUTURE EVENT REGION IN ORDER OF ARRIVAL TIME)

ST170

DISPLAY AND OUTPUT IMAGE LIST SCREEN
INCLUDING SIMPLE EVENT INFORMATION
(FUTURE EVENT IMAGE)

END

INFORMATION PROCESSING APPARATUS, OPERATION METHOD OF INFORMATION PROCESSING APPARATUS, AND OPERATION PROGRAM OF INFORMATION PROCESSING APPARATUS

CROSS-REFERENCE TO RELATED APPLICATIONS

This application is a continuation application of International Application No. PCT/JP2022/003922 filed on Feb. 2, 2022, the disclosure of which is incorporated herein by reference in its entirety. Further, this application claims priority from Japanese Patent Application No. 2021-057321 filed on Mar. 30, 2021, the disclosure of which is incorporated herein by reference in its entirety.

BACKGROUND

1. Technical Field

The technology of the present disclosure relates to an information processing apparatus, an operation method of an information processing apparatus, and an operation program of an information processing apparatus.

2. Description of the Related Art

In the related art, in order to enable viewing of a plurality of images possessed by a user collectively, a method of displaying a list of the plurality of images arranged vertically and horizontally has been adopted. For example, JP2013-084282A describes the technology of displaying a list of a plurality of images arranged in an order of an imaging date and time or in an order of an imaging position.

SUMMARY

In the image list display in the related art, it is possible to look back on the past memories by viewing the image of the past. Looking back on these memories will give an opportunity to think about an event of the future, such as where to go next or what kind of pictures to capture in the next place. In order to make the thought for the event of the future more concrete, it has been desired to display an image of the past and an image of the event of the future in a form in which it is possible to think about the event of the future while looking back on the past memories.

An embodiment of the technology of the present disclosure provides an information processing apparatus, an operation method of an information processing apparatus, and an operation program of an information processing apparatus capable of thinking about an event of the future more specifically while looking back on the past memories.

The present disclosure relates to an information processing apparatus comprising a processor, and a memory connected to or built in the processor, in which the processor is configured to: in a case in which an image list screen in which images possessed by a user are arranged in time series is generated, dispose a future event image, which is an image of an event of future related to the user, in a future region in a time-series arrangement direction with respect to a latest image among the images; and output the generated image list screen.

It is preferable that the processor is configured to: dispose an icon on which the future event image is displayed, in the future region in a selectable manner; in a case in which the icon is selected, generate a future event image list screen in which the future event images are arranged; and output the generated future event image list screen.

It is preferable that the processor is configured to: arrange the future event images in an order of arrival time of the event in the future event image list screen.

It is preferable that the future event image is at least one of a registration event image related to a registration event registered as a schedule by the user, or a recommendation event image related to a recommendation event recommended to the user.

It is preferable that the processor is configured to: display, in the image list screen, an image captured by the user in the registration event experienced by the user to be distinguishable from an image that is not related to the registration event.

It is preferable that the processor is configured to: in a case in which the image captured by the user in the registration event experienced by the user is selected in the image list screen, generate an image display screen including the selected image and a link for accessing the registration event image of the registration event experienced by the user; and output the generated image display screen.

It is preferable that the processor is configured to: generate a registration screen including the registration event image of the registration event experienced by the user, a button for re-registering the registration event as a schedule, and a button for recommending the registration event to an acquaintance of the user; and output the generated registration screen.

It is preferable that the recommendation event includes an event selected based on an attribute of the user.

The present disclosure relates to an operation method of an information processing apparatus, the method comprising: disposing, in a case in which an image list screen in which images possessed by a user are arranged in time series is generated, a future event image, which is an image of an event of future related to the user, in a future region in a time-series arrangement direction with respect to a latest image among the images; and outputting the generated image list screen.

The present disclosure relates to an operation program of an information processing apparatus for causing a computer to execute a process comprising: disposing, in a case in which an image list screen in which images possessed by a user are arranged in time series is generated, a future event image, which is an image of an event of future related to the user, in a future region in a time-series arrangement direction with respect to a latest image among the images; and outputting the generated image list screen.

According to the technology of the present disclosure, it is possible to provide the information processing apparatus, the operation method of the information processing apparatus, and the operation program of the information processing apparatus capable of thinking about the event of the future more specifically while looking back on the past memories.

BRIEF DESCRIPTION OF THE DRAWINGS

Exemplary embodiments according to the technique of the present disclosure will be described in detail based on the following figures, wherein:

FIG. 15 is a flowchart showing a procedure of processing of the user terminal;

DETAILED DESCRIPTION

Figure 1:
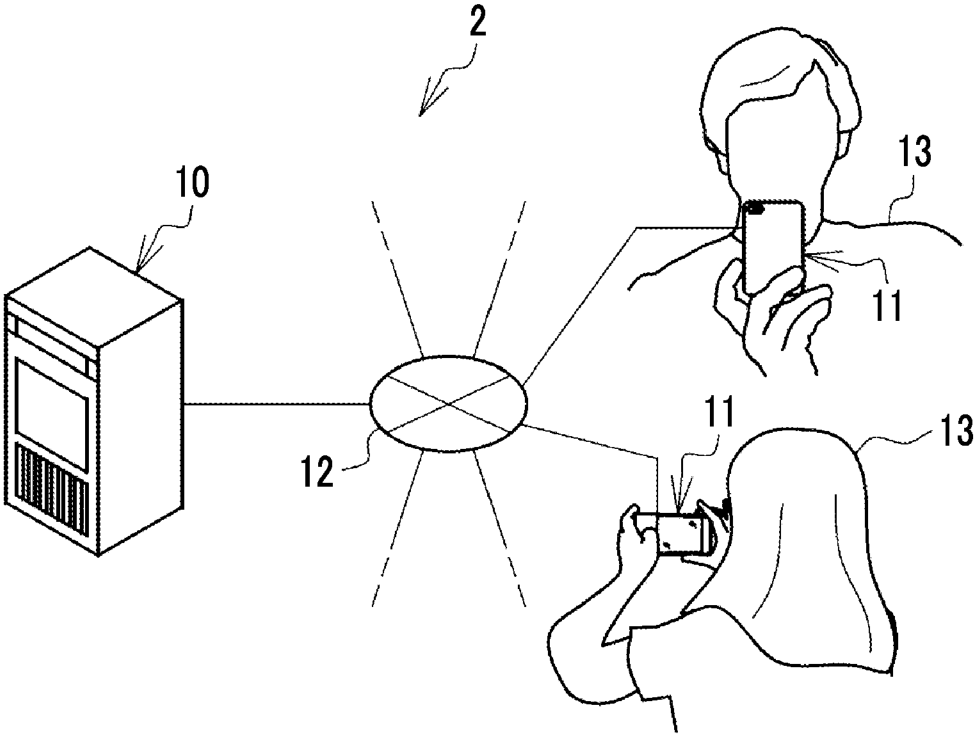
FIG. 1 is a diagram showing an image management system.

As an example, as shown in FIG. 1, an image management system 2 comprises an image management server 10 and a plurality of user terminals 11. The image management server 10 and the user terminal 11 are connected to each other via a network 12 to be able to communicate with each other. The network 12 is a wide area network (WAN) of, for example, the Internet or a public communication network.

The image management server 10 is, for example, a server computer, a workstation, and the like. The user terminal 11 is a terminal possessed by each user 13, and is an example of an "information processing apparatus" according to the technology of the present disclosure. The user terminal 11 has at least a function of reproducing and displaying an image 22 (see FIG. 2 and the like) and a function of transmitting the image 22 to the image management server 10. The user terminal 11 is, for example, a smartphone, a tablet terminal, a personal computer, and the like.

Figure 2:
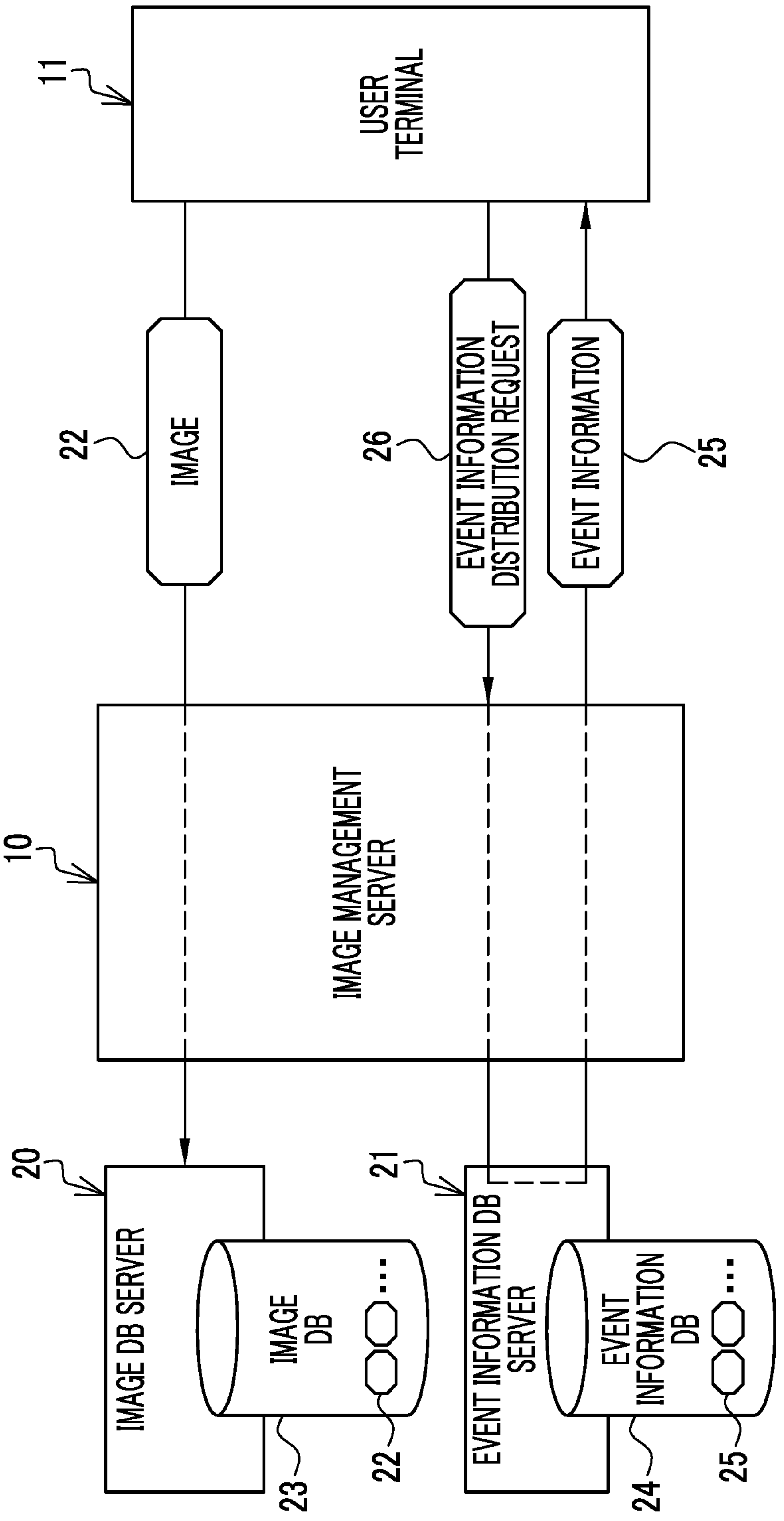
FIG. 2 is a diagram showing information exchanged between an image management server and a user terminal.

As an example, as shown in FIG. 2, the image management server 10 is connected with an image database (hereinafter, abbreviated as DB) server 20 and an event information DB server 21 via a network (not shown), such as a local area network (LAN). The image management server 10 transmits the image 22 from the user terminal 11 to the image DB server 20. The image DB server 20 includes an image DB 23. The image DB server 20 accumulates the image 22 from the image management server 10 in the image DB 23, and manages the image 22. In addition, the image DB server 20 transmits the image 22 accumulated in the image DB 23 to the image management server 10 according to a request from the image management server 10.

The event information DB server 21 includes an event information DB 24. Event information 25 is stored in the event information DB 24. The event information 25 is information on an event of the future related to the user 13. Here, the event includes a place to which the user 13 goes, such as a recreational area, a theme park, a historic site, an art gallery, and a museum, a program in which the user 13 participates, such as a farming experience, a craft experience, and a lifelong learning experience, and the like. In addition to the above examples, the event may include a concert, a soccer match, an exhibition, an online seminar, and the like. The event information 25 is registered in advance by a person in charge of the place in a case in which the event is the place, and by an organizer of the program in a case in which the event is the program.

The image management server 10 receives an event information distribution request 26 from the user terminal 11. The image management server 10 requests the event information DB server 21 to transmit the event information 25 according to the event information distribution request 26. The event information DB server 21 searches the event information DB 24 for the event information 25 according to a request from the image management server 10, and transmits the searched event information 25 to the image management server 10. The image management server 10 distributes the event information 25 from the event information DB server 21 to the user terminal 11 that is a transmission source of the event information distribution request 26.

Figure 3:
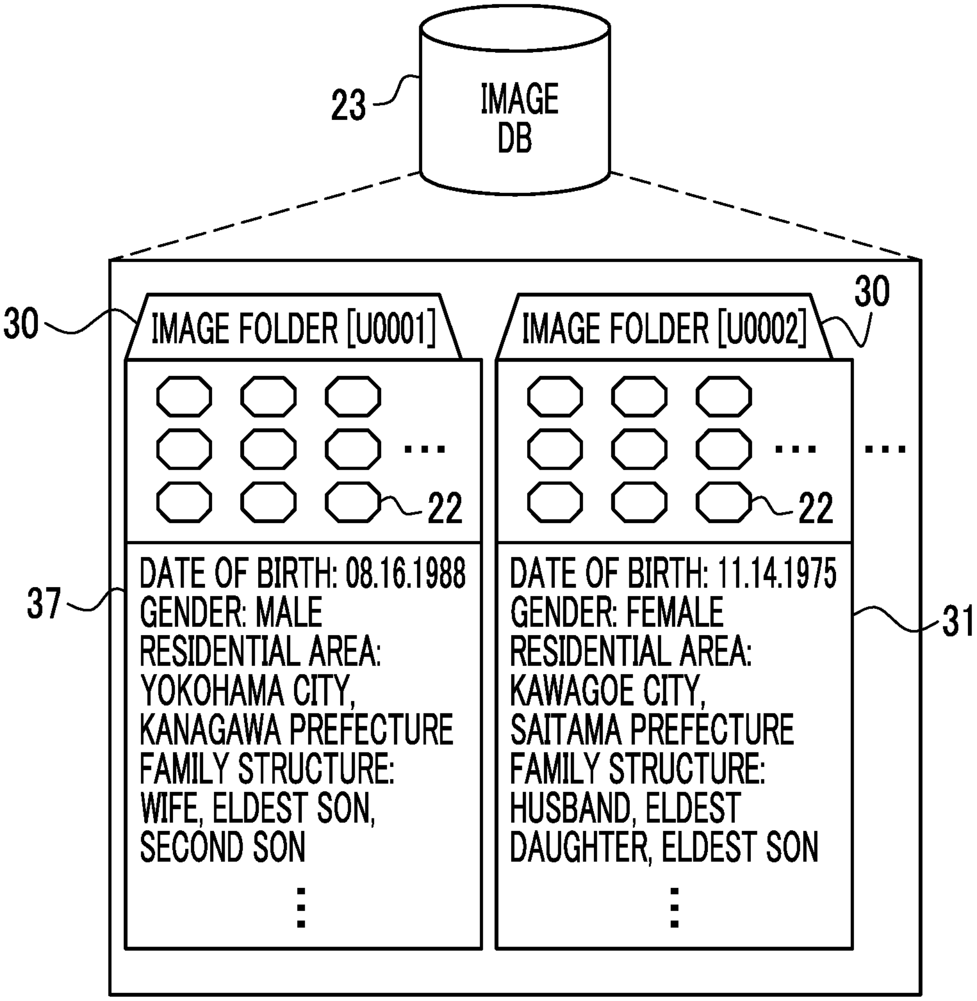
FIG. 3 is a diagram showing an inside of an image DB.

As shown in FIG. 3 as an example, the image DB 23 is provided with a plurality of image folders 30. The image folder 30 is a folder allocated to each user 13 one by one, and is a folder unique to one user 13. Therefore, the image folders 30 are provided for the number of the users 13. User identification data (ID) for uniquely identifying the user 13, such as [U0001] and [U0002], is associated with the image folder 30.

The image 22 possessed by the user 13 is stored in the image folder 30. The image 22 possessed by the user 13 includes an image captured by the user 13 using a camera function of the user terminal 11. In addition, the image 22 possessed by the user 13 also includes an image captured by using a digital camera other than the user terminal 11. Further, the image 22 possessed by the user 13 also includes an image received by the user 13 from another user 13, such as a friend or a family, an image downloaded by the user 13 on the Internet site, an image read by the user 13 with a scanner, and the like. The image 22 in the image folder 30 is periodically synchronized with the image 22 locally stored in the user terminal 11.

Attribute information 31 of the user 13 is associated with the image folder 30. The attribute information 31 is registered by the user 13. The attribute information 31 includes a date of birth, a gender, a residential area, a family structure, or the like of the user 13. The residential area is a combination of prefecture, city, ward, town, and village.

Figure 4:
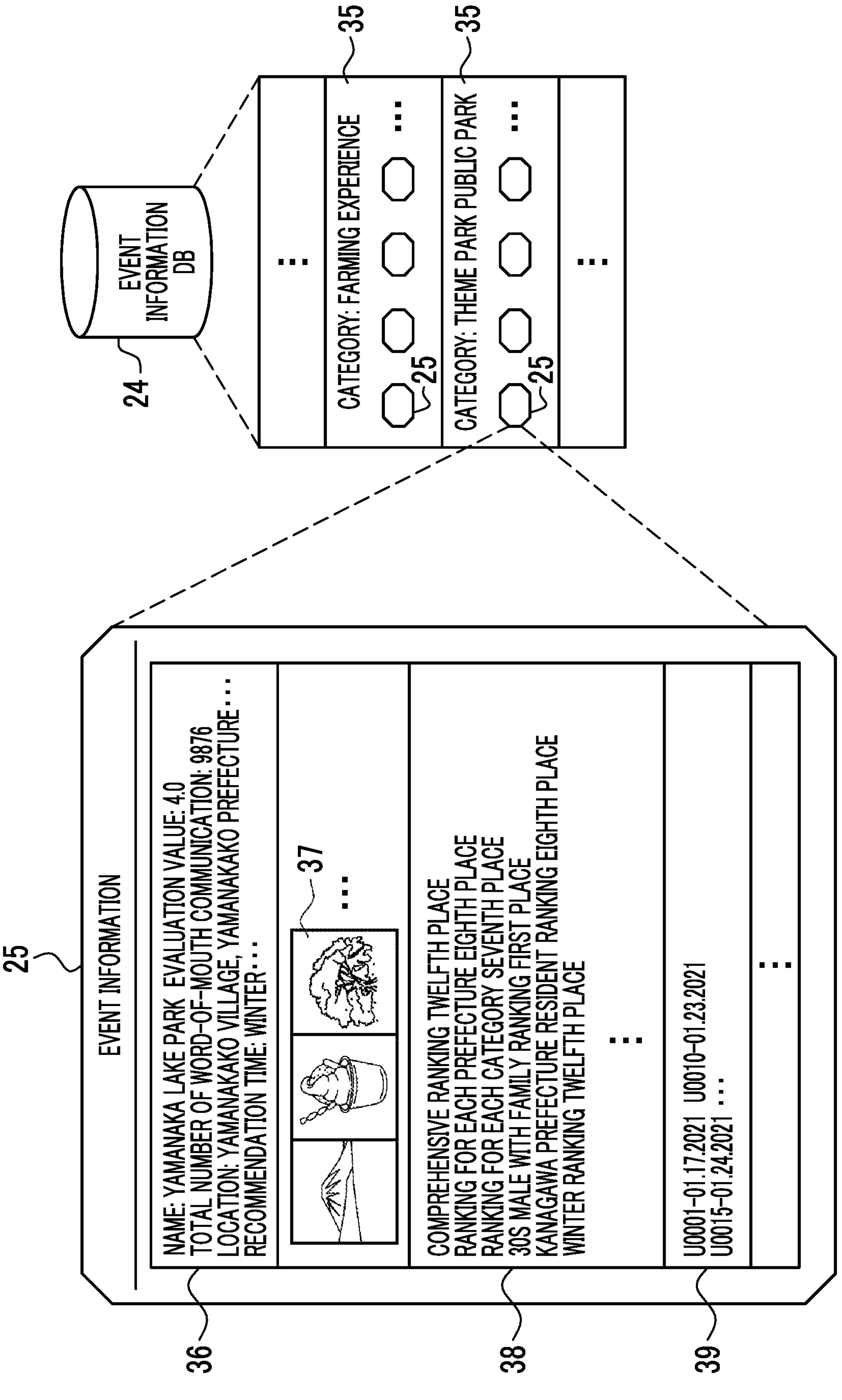
FIG. 4 is a diagram showing an inside of an event information DB and a content of event information.

As shown in FIG. 4 as an example, the event information DB 24 is divided into a plurality of categories 35, and a plurality of pieces of event information 25 is stored in each category 35. The category 35 is a major classification of events, such as "farming experience" and "theme park public park". In addition to these, category 35 also includes "shrine and temple", "old burial mound", "hot spring spa", "art gallery and museum", "crafts experience", and "lifelong learning experience".

The event information 25 includes basic information 36, future event image 37, ranking information 38, registration user information 39, and the like. The basic information 36 includes a name, an evaluation value, the total number of word-of-mouth communication, a location, a recommendation time, and the like. The name is a name of the place in a case in which the event is the place, and is a name of the program in a case in which the event is the program. The evaluation value is a numerical value input by the user 13 who has experienced the event, through the user terminal 11, and is represented by, for example, 5 stages. The total number of word-of-mouth communication is the total number of word-of-mouth communication input by the user 13 who has experienced, the event through the user terminal 11. The location is an address of the place in a case in which the event is the place, and is an address of a place in which the program is executed in a case in which the event is the program. The recommendation time is a time when the event is particularly recommended, such as winter, summer, Christmas, New Year, and October.

The future event image 37 is an image that directly represents the content of the event. A plurality of future event images 37 are registered. The future event image 37 is an image captured by a person in charge of the event or the organizer. In addition, the future event image 37 may be an image captured by the user 13 who has experienced the event, by using the camera function of the user terminal 11. In this case, a so-called "like button" is used to vote on support for each image, and an image having a relatively large amount of support is adopted as the future event image 37.

As described above, the future event image 37 is an image captured in the past. The "future" of the future event image 37 does not mean an image which will be captured in the future, but merely means an image of an event that the user 13 will experience in the future.

The ranking information 38 includes a comprehensive ranking, a ranking for each prefecture, a ranking for each category, a ranking for each attribute of the user 13, a ranking for each time, and the like. These rankings are ordered based on the number of times the event is registered as a schedule by the user 13. Examples of the ranking for each attribute include rankings related to an age, a gender, and a family structure of the user 13, such as "30s male with family ranking". In addition, examples of the ranking for each attribute also include a ranking related to the residential area of the user 13, such as "Kanagawa prefecture resident ranking". Examples of the ranking for each time include a ranking related to each time of spring, summer, autumn, and winter, such as "winter ranking".

The registration user information 39 stores a combination of the user ID of the user 13 who has registered the event as the schedule, such as "U0001-2021.01.17", and a schedule date for the user 13 to go to the event. In a case in which the user 13 cancels the schedule, and in a case in which the schedule date has elapsed, the combination of the user ID and the schedule date is deleted from the registration user information 39.

Figure 5:
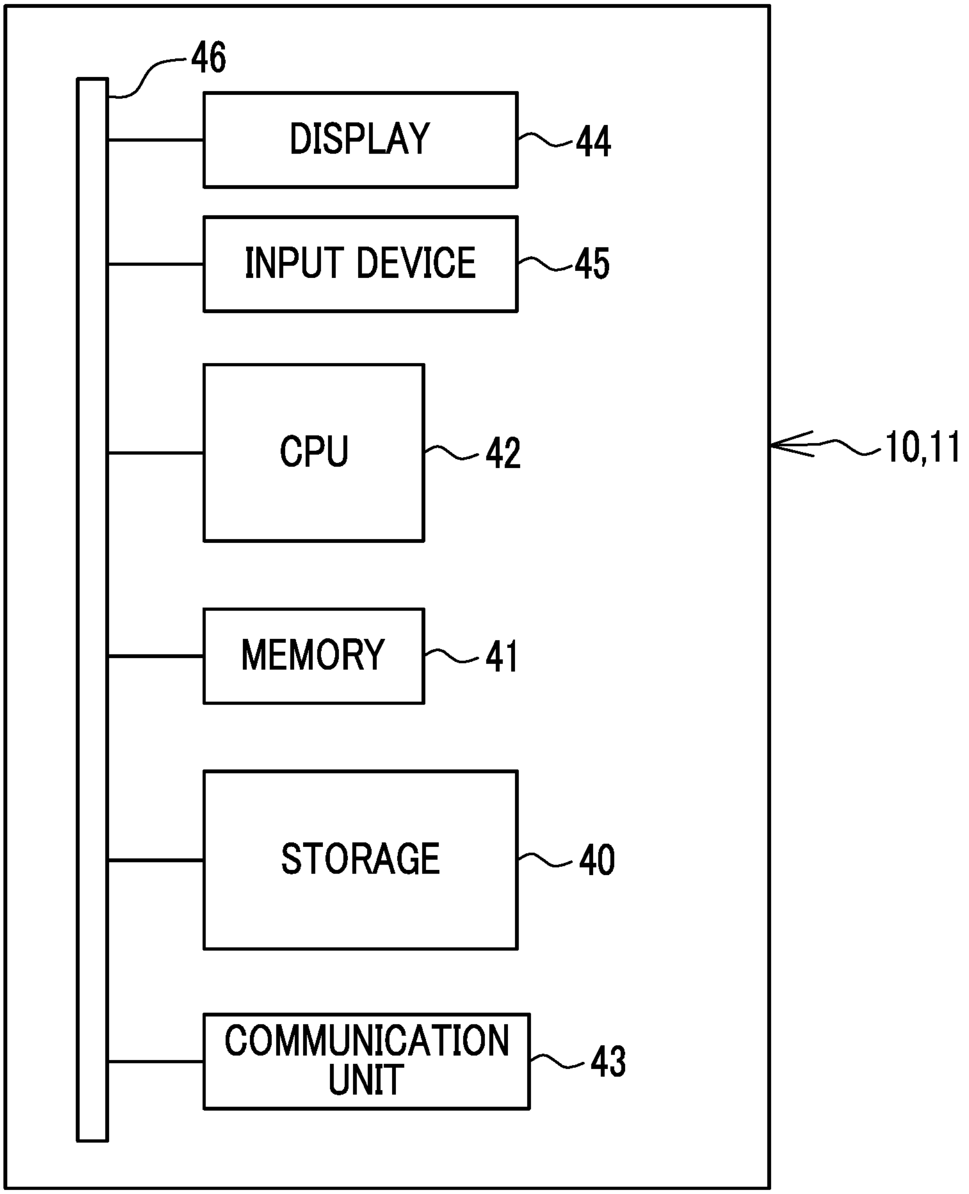
FIG. 5 is a block diagram showing computers constituting the image management server and the user terminal.

As shown in FIG. 5 as an example, the computers constituting the image management server 10 and the user terminal 11 basically have the same configuration, and comprise a storage 40, a memory 41, a central processing unit (CPU) 42, a communication unit 43, a display 44, and an input device 45. These units are connected to each other via a busline 46.

The storage 40 is a hard disk drive that is built in the computers constituting the image management server 10 and the user terminal 11 or connected thereto through a cable or a network. Alternatively, the storage 40 is a disk array in which a plurality of hard disk drives are mounted. A control program, such as an operating system, various application programs (hereinafter, abbreviated as AP), various data associated with these programs, and the like are stored in the storage 40. It should be noted that a solid state drive may be used instead of the hard disk drive.

The memory 41 is a work memory for the CPU 42 to execute processing. The CPU 42 loads the program stored in the storage 40 into the memory 41, and executes processing according to the program. Accordingly, the CPU 42 integrally controls the respective units of the computer. The CPU 42 is an example of a "processor" according to the technology of the present disclosure. It should be noted that the memory 41 may be built in the CPU 42.

The communication unit 43 is a network interface that performs control of transmitting various types of information via the network 12 and the like. The display 44 displays various screens. Various screens are provided with an operation function by a graphical user interface (GUI). The computers constituting the image management server 10 and the user terminal 11 receive input of an operation instruction from the input device 45 through various screens. The input device 45 is a keyboard, a mouse, a touch panel, and the like.

It should be noted that, in the following description, for distinction, a subscript "A" is assigned to a reference numeral of each unit of the computer constituting the image management server 10 and a subscript "B" is assigned to a reference numeral of each unit of the computer constituting the user terminal 11.

Figure 6:
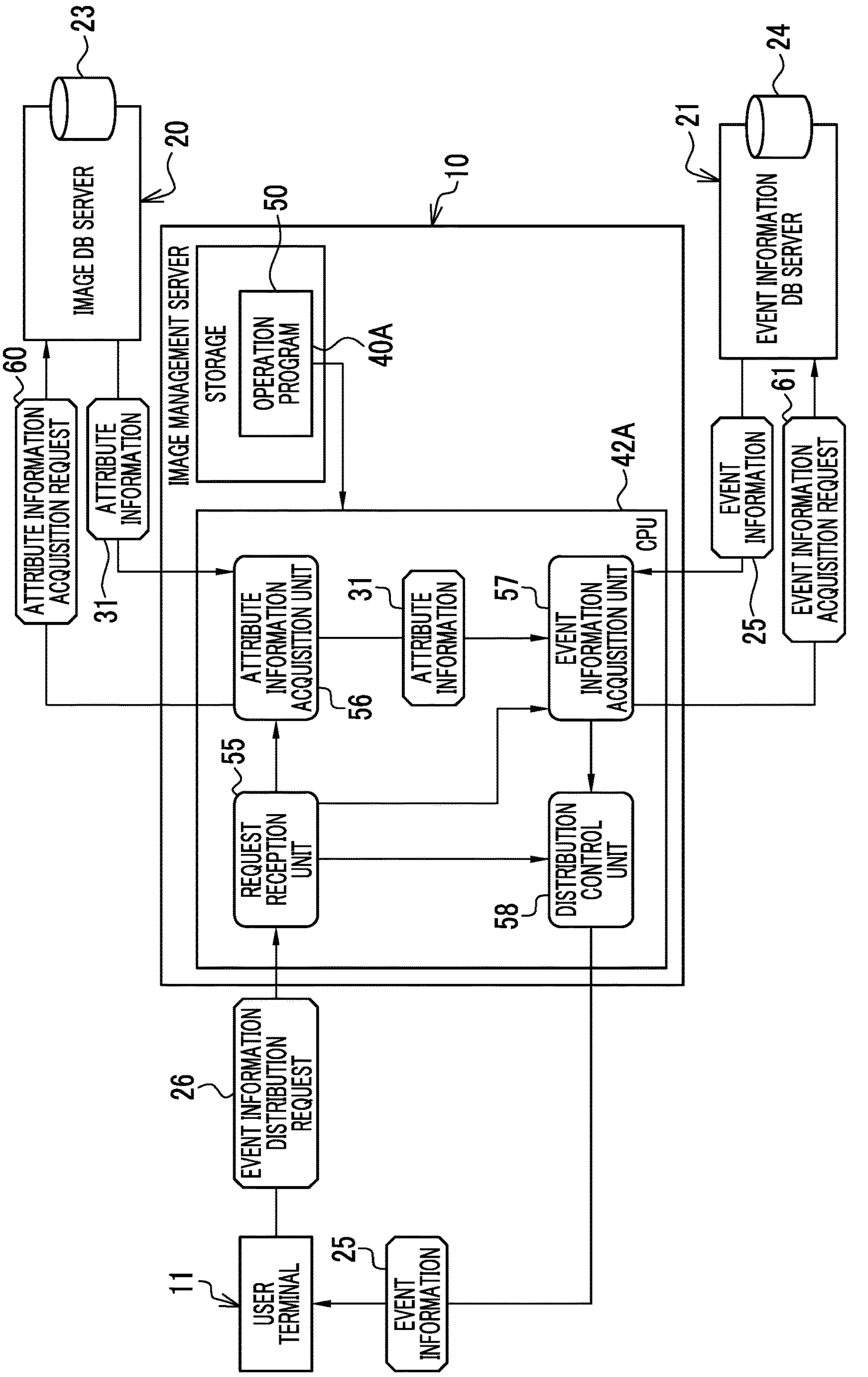
FIG. 6 is a block diagram showing a processing unit of a CPU of the image management server.

For example, as shown in FIG. 6, an operation program 50 is stored in a storage 40A of the image management server 10. In a case in which the operation program 50 is started up, a CPU 42A of the image management server 10 functions as a request reception unit 55, an attribute information acquisition unit 56, an event information acquisition unit 57, and a distribution control unit 58 in cooperation with the memory 41 and the like.

The request reception unit 55 receives various requests from the user terminal 11. The request reception unit 55 receives, for example, the event information distribution request 26. The event information distribution request 26 includes the user ID and a terminal ID. The terminal ID is an ID of the user terminal 11 that transmits the event information distribution request 26. The request reception unit 55 outputs the user ID of the event information distribution request 26 to the attribute information acquisition unit 56 and the event information acquisition unit 57. Also, the request reception unit 55 outputs the terminal ID of the event information distribution request 26 to the distribution control unit 58.

In a case in which the user ID of the event information distribution request 26 is input from the request reception unit 55, the attribute information acquisition unit 56 transmits the attribute information acquisition request 60 to the image DB server 20. The attribute information acquisition request 60 is a copy of the user ID of the event information distribution request 26, and is a content of requesting the attribute information 31 of the user 13 of the user ID.

The image DB server 20 reads out the attribute information 31 according to the attribute information acquisition request 60 from the image DB 23, and transmits the read out attribute information 31 to the image management server 10. The attribute information acquisition unit 56 acquires the attribute information 31 transmitted from the image DB server 20 according to the attribute information acquisition request 60. The attribute information acquisition unit 56 outputs the acquired attribute information 31 to the event information acquisition unit 57.

The event information acquisition unit 57 transmits an event information acquisition request 61 for requesting the event information 25 according to the user ID of the event information distribution request 26 from the request reception unit 55 and the attribute information 31 from the attribute information acquisition unit 56 to the event information DB server 21. The event information DB server 21 reads out the event information 25 requested in the event information acquisition request 61 from the event information DB 24, and transmits the read out event information 25 to the image management server 10. The event information acquisition unit 57 acquires the event information 25 transmitted from the event information DB server 21. The event information acquisition unit 57 outputs the acquired event information 25 to the distribution control unit 58.

The distribution control unit 58 performs control of distributing the event information 25 from the event information acquisition unit 57 to the user terminal 11 that is the transmission source of the event information distribution request 26. In this case, the distribution control unit 58 specifies the user terminal 11 that is the transmission source of the event information distribution request 26 based on the terminal ID of the event information distribution request 26 from the request reception unit 55.

Figure 7:
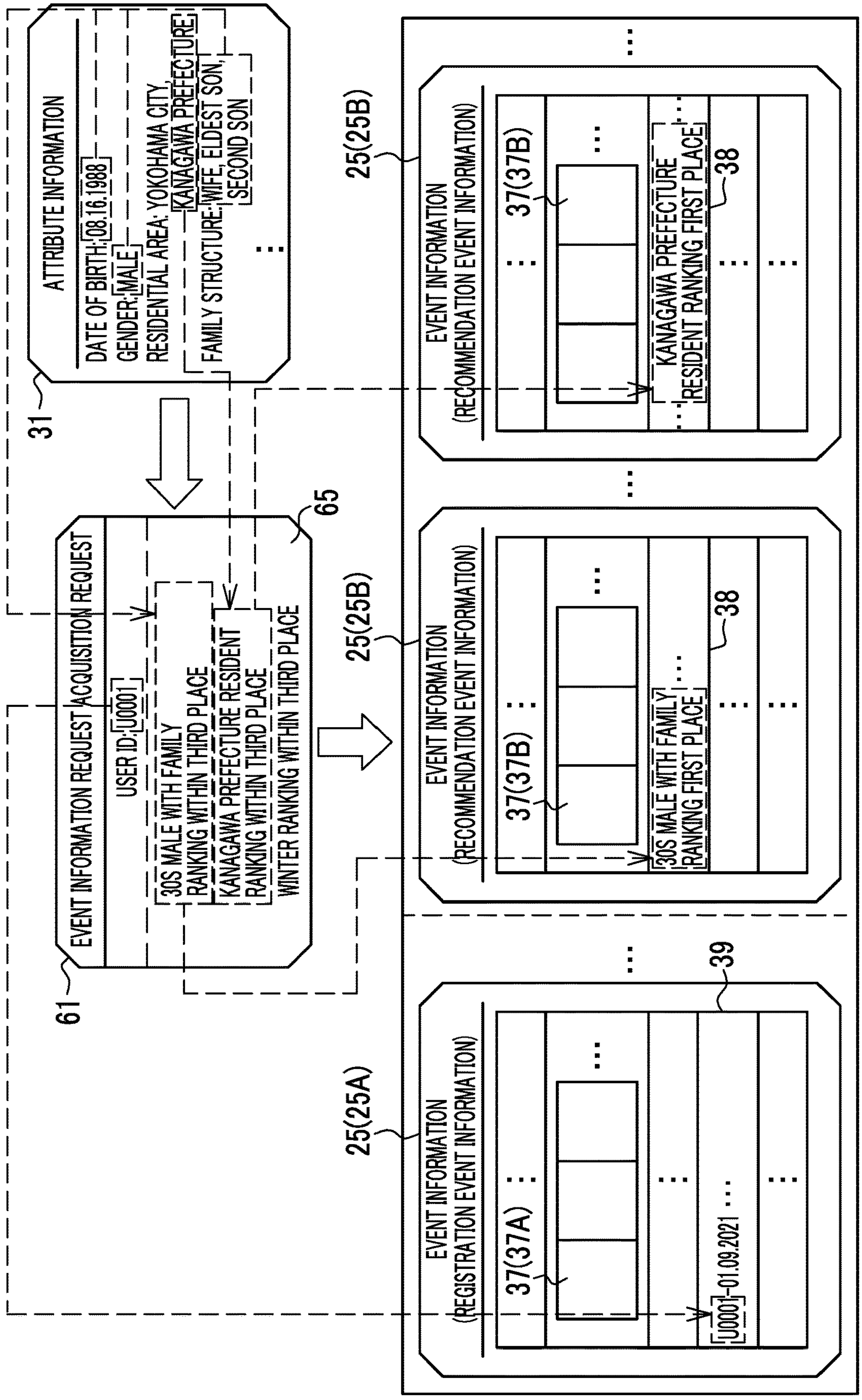
FIG. 7 is a diagram showing an event information acquisition request and event information according to the event information acquisition request.

As shown in FIG. 7 as an example, the event information acquisition request 61 includes the user ID. In a case in which the event information 25, which is registered by the user ID of the event information acquisition request 61 in the registration user information 39, is present in the event information DB 24, the event information DB server 21 reads out the event information 25 as registration event information 25A from the event information DB 24. The registration event information 25A means information related to a registration event that is an event registered as the schedule by the user 13. Hereinafter, the future event image 37, which is registered in the registration event information 25A, will be referred to as a registration event image 37A.

In addition, the event information acquisition request 61 includes a ranking condition 65. The ranking condition 65 is set based on the attribute information 31 and the time. Specifically, the ranking condition 65 is a condition for the ranking related to the age, the gender, and the family structure of the user 13 which can be seen from the attribute information 31, a condition for the ranking related to the residential area of the user 13, and a condition for the ranking related to the time. In FIG. 7, as the ranking condition 65 for the ranking related to the age, the gender, and the family structure of the user 13, the "30s male with family ranking within third place" is described as an example. In addition, as the ranking condition 65 for the ranking related to the residential area of the user 13, the "Kanagawa prefecture resident ranking within third place" is described as an example. Further, as the ranking condition 65 for the ranking related to the time, "winter ranking within third place" is described as an example.

The event information DB server 21 reads out the event information 25 including the ranking information 38 that satisfies each ranking condition 65 from the event information DB 24, as recommendation event information 25B. The recommendation event information 25B means information related to a recommendation event that is an event recommended to the user 13. Hereinafter, the future event image 37, which is registered in the recommendation event information 25B, will be referred to as a recommendation event image 37B.

The recommendation event information 25B that satisfies the ranking condition 65 for the ranking related to the age, gender, and family structure of the user 13 is the information on the event selected based on the attribute of the user 13. In addition, the recommendation event information 25B that satisfies the ranking condition 65 for the ranking related to the residential area of the user 13 is also the information on the event selected based on the attribute of the user 13. Therefore, the recommendation event includes the event selected based on the attribute of the user 13.

As described above, at least the recommendation event information 25B is included in the event information 25 that is acquired by the event information acquisition unit 57 and distributed from the distribution control unit 58 to the user terminal 11. The registration event information 25A may or may not be included in the event information 25 distributed to the user terminal 11. That is, in a case in which the user 13 does not register the event as the schedule at all and the event information 25 in which the user ID that matches the user ID of the event information acquisition request 61 is registered in the registration user information 39 is not present in the event information DB 24, the registration event information 25A is not included in the event information 25 distributed to the user terminal 11.

Figure 8:
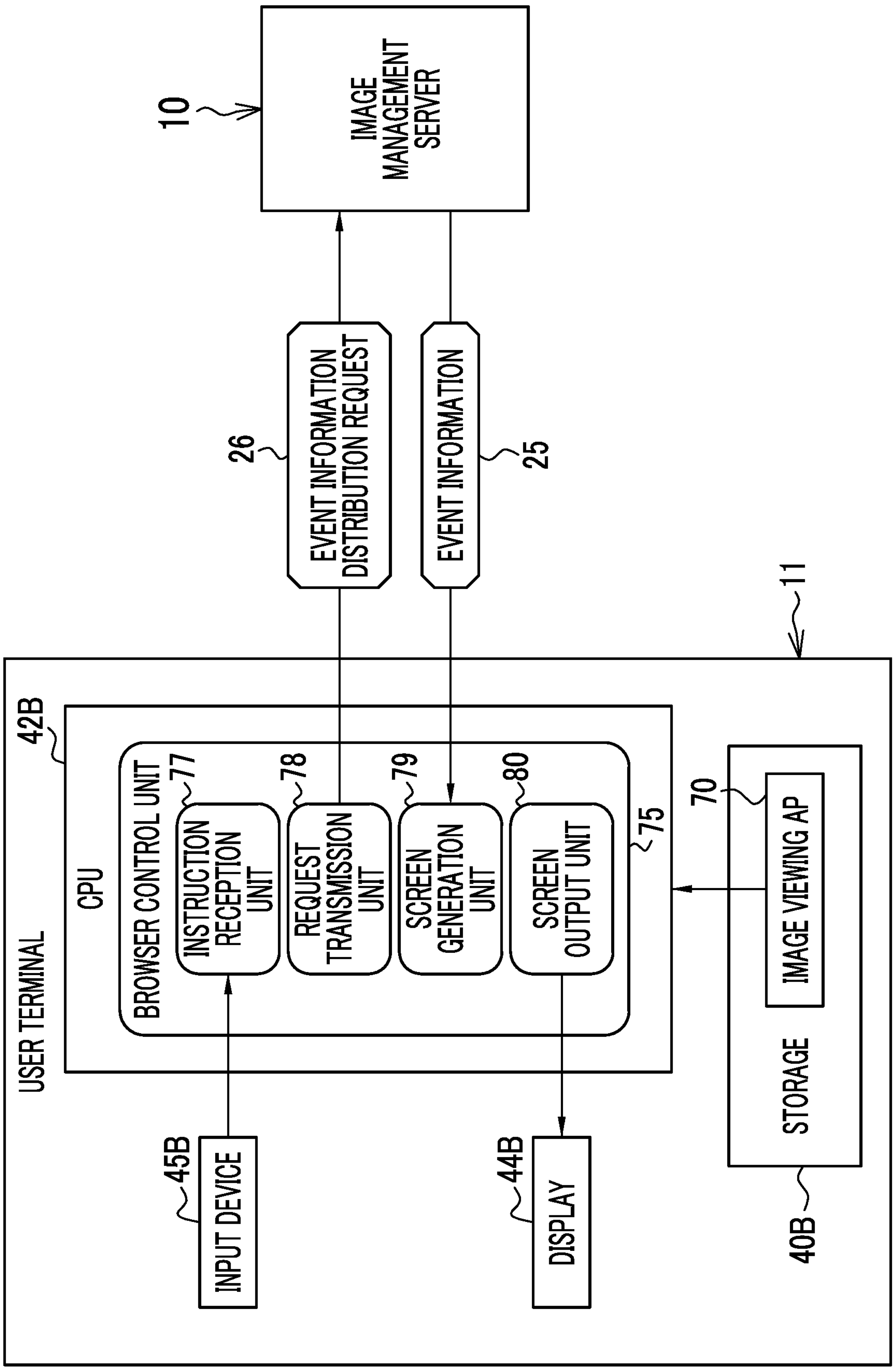
FIG. 8 is a block diagram showing a processing unit of a CPU of the user terminal.

As an example, as shown in FIG. 8, an image viewing AP 70 is stored in a storage 40B of the user terminal 11. The image viewing AP 70 is an AP for causing the computer constituting the user terminal 11 to function as an "information processing apparatus" according to the technology of the present disclosure. In other words, the image viewing AP 70 is an example of an "operation program of an information processing apparatus" according to the technology of the present disclosure. A CPU 42B of the user terminal 11 functions as a browser control unit 75 in cooperation with the memory 41 and the like. The browser control unit 75 controls an operation of a web browser dedicated to the image viewing AP 70.

The browser control unit 75 includes an instruction reception unit 77, a request transmission unit 78, a screen generation unit 79, and a screen output unit 80. The instruction reception unit 77 receives various operation instructions input from an input device 45B by the user 13 through various screens. The request transmission unit 78 transmits various requests according to the operation instructions to the image management server 10. For example, the request transmission unit 78 transmits the event information distribution request 26 to the image management server 10 according to an instruction to start up the image viewing AP 70.

The screen generation unit 79 generates various screens, such as an image list screen 90A (see FIG. 9), based on the image 22 (not shown) locally stored in the storage 40B and the event information 25 from the image management server 10. The screen generation unit 79 outputs screen data of various generated screens to the screen output unit 80. The screen output unit 80 displays and outputs various screens on a display 44B based on the screen data of various screens from the screen generation unit 79.

Figure 9:
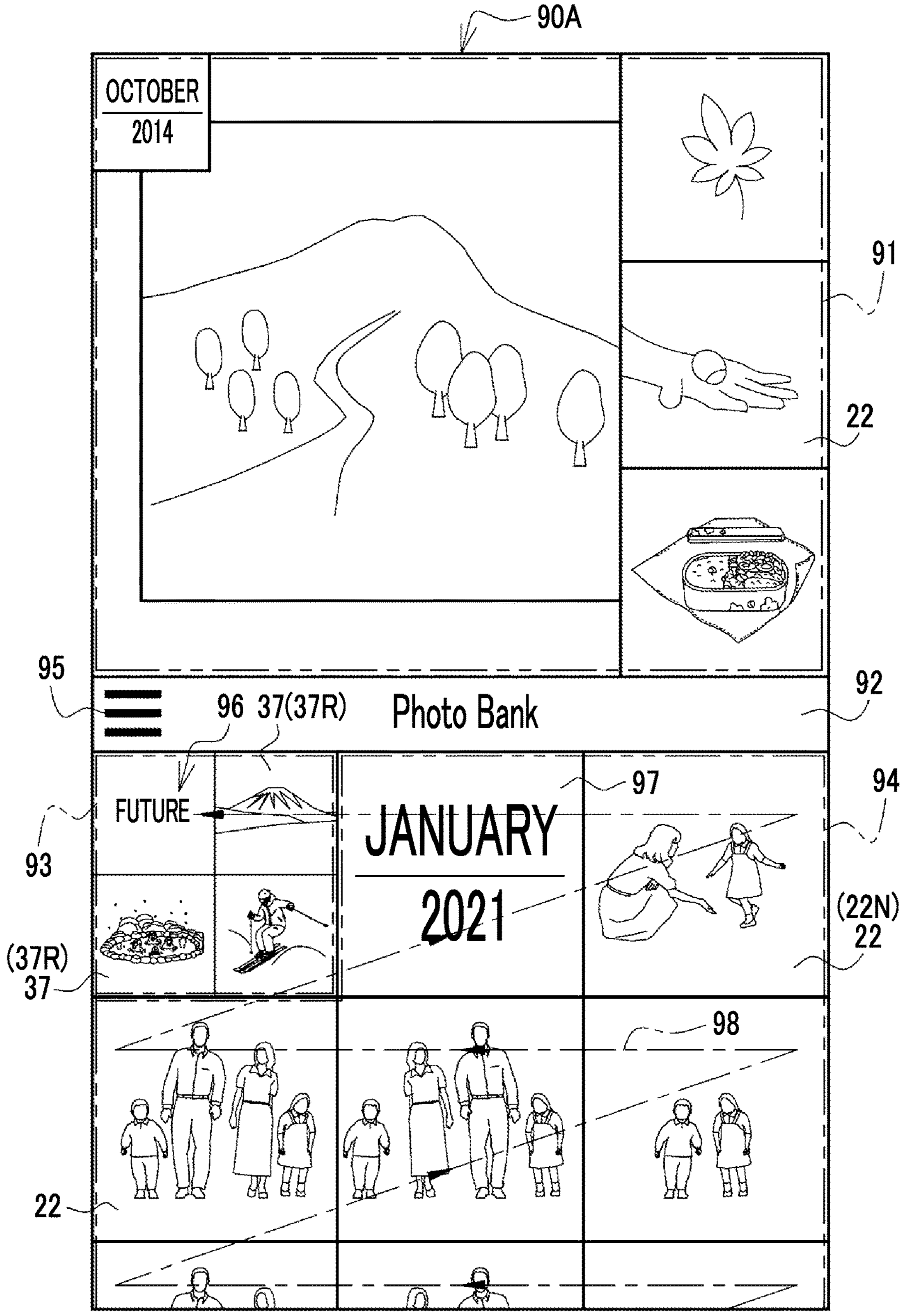
FIG. 9 is a diagram showing an image list screen displayed in a case in which an image viewing AP is started up.

FIG. 9 shows an example of the image list screen 90A displayed in a case in which the image viewing AP 70 is started up. The image list screen 90A has, in an order from the top, a combination image display region 91, a menu button display region 92, a future event display region 93, and a past image display region 94.

In the combination image display region 91, a plurality of randomly selected images 22 of a relatively distant past year and month are displayed according to a layout set in advance. The image 22 in the combination image display region 91 can be selected. In a case in which the image 22 in the combination image display region 91 is selected, a screen is displayed in which each image 22 is enlarged such that it is possible to feed and return the images 22 one by one. The combination image display region 91 allows the user 13 to look back on memories of a relatively distant past. FIG. 9 shows an example in which one of four images 22 of October 2014 is enlarged and displayed on the left side, and three images thereof are vertically displayed in parallel on the right side.

Here, "feed" in "possible to feed and return the images 22 one by one" means, for example, that the display of one enlarged image 22 is switched one after another in the newest order of the acquisition date and time by a left swipe operation. In addition, "return" of "possible to feed and return the images 22 one by one" means, for example, that the display of one enlarged image 22 is switched one after another in an order of the older acquisition date and time by a right swipe operation. The same applies to "possible to feed and return" in the following description. Returning to the image list screen 90A from the screen in which the image 22 in the combination image display region 91 is enlarged can be performed, for example, by selecting a close button provided in the screen in which the image 22 in the combination image display region 91 is enlarged. It should be noted that the acquisition date and time is any one of a date and time when the image 22 is captured, a date and time when the image 22 is downloaded, and a date and time when the image 22 is read by a scanner.

The menu button display region 92 is positioned at a substantially central portion of the image list screen 90A, and separates the combination image display region 91 on the upper portion, and the future event display region 93 and the past image display region 94 on the lower portion. A menu button 95 is displayed in the left corner of the menu button display region 92. In a case in which the menu button 95 is selected, various menus can be selected and pop-up displayed in the image list screen 90A.

An icon 96 is disposed in the future event display region 93 in a selectable manner. A representative image 37R of the future event image 37 registered in the event information 25 transmitted from the image management server 10 is displayed on the icon 96. The representative image 37R includes the registration event image 37A and/or the recommendation event image 37B.

In the past image display region 94, the images 22 of the past are arranged in time series following a frame 97 representing the current year and month. More specifically, as shown by a one dot chain line arrow 98, the images 22 are arranged in an order from oldest to newest acquisition date and time from the bottom to the top and from right to left. That is, a time-series arrangement direction of the images 22 as viewed as a whole is from the bottom to the top. The time-series arrangement direction of the images 22 as viewed as one row in which the plurality of images 22 having different acquisition dates and times (here, the images 22 for three frames) are arranged is from right to left. Therefore, the image 22 disposed next to the frame 97 is a latest image 22N among the images 22 of the past. The image 22 in the past image display region 94 can be selected. In a case in which the image 22 in the past image display region 94 is selected, a screen is displayed in which each image 22 is enlarged such it is possible to feed and return the images 22 one by one, as in a case of the combination image display region 91.

It should be noted that it is possible to further display the image 22 of the past in the past image display region 94 by the swipe operation. For example, in a case in which the past image display region 94 is swiped from the bottom to the top, the images 22 of the past are displayed in the past image display region 94 in the oldest order of the acquisition date and time. In this case, the display of the icon 96 remains unchanged, and the year and month to which the acquisition date and time of the image 22 displayed in the past image display region 94 belongs, more specifically, the year and month of the acquisition date and time of the latest image 22N among the plurality of images 22 displayed in the past image display region 94 are displayed on the frame 97 representing the current year and month. Alternatively, in a case in which the swipe operation is performed on the past image display region 94, the icon 96 and/or the frame 97 representing the current year and month may disappear. Then, the image 22 of the past may be disposed at a position of the icon 96 and/or the frame 97 representing the current year and month.

The future event display region 93 in which the icon 96 is disposed is positioned on the left side of the latest image 22N across the frame 97 in the first line of the past image display region 94 in which the latest image 22N is disposed. As described above, the time-series arrangement direction of the images 22 as viewed as one row is from right to left. That is, the future event display region 93 is an example of a "future region" according to the technology of the present disclosure.

Figure 10:
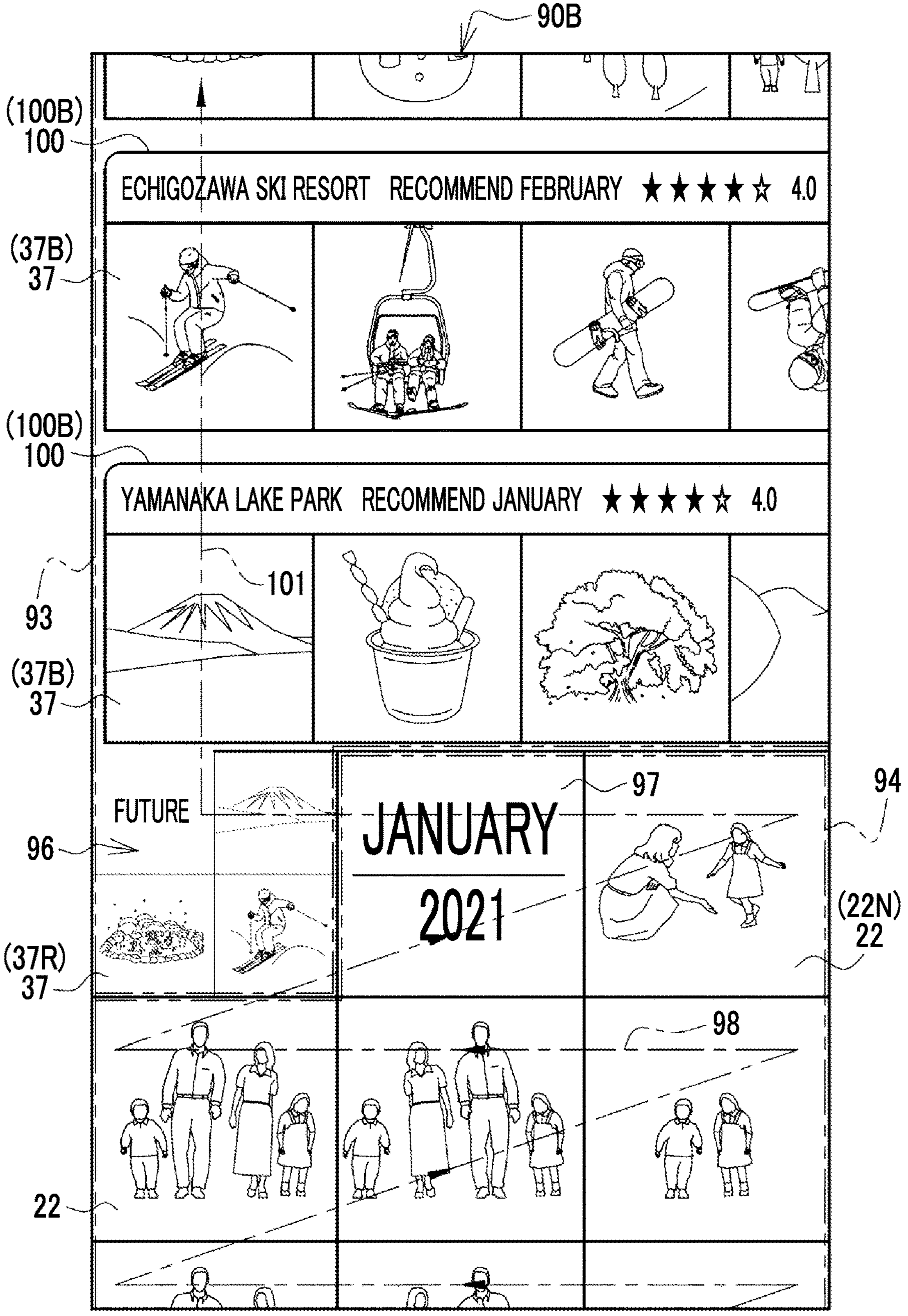
FIG. 10 is a diagram showing an image list screen displayed in a case in which an icon is selected.

In a case in which the icon 96 is selected, the transition to an image list screen 90B shown in FIG. 10 as an example is performed. In FIG. 10, the image list screen 90B is a screen in which the combination image display region 91 and the menu button display region 92 disappear, and the combination image display region 91 and the menu button display region 92 are all replaced with the future event display region 93. The representative image 37R in the icon 96 is grayed out in the image list screen 90B. It should be noted that the combination image display region 91, the menu button display region 92, and the icon 96 may not be displayed from the beginning, and the image list screen 90B of FIG. 10 may be displayed in a case in which the image viewing AP 70 is started up.

It should be noted that, here, one ¼ frame on which a character "FUTURE" is drawn and three ¼ frames on which the representative image 37R of the future event image 37 is drawn are combined to form the icon 96, and the icon 96 is used as a selection target, but the technology of the present disclosure is not limited to this. The ¼ frame on which the character "FUTURE" is drawn and the ¼ frame on which the representative image 37R of the future event image 37 is drawn may be displayed in a selectable manner. In this case, in a case in which the ¼ frame on which the character "FUTURE" is drawn is selected in the image list screen 90A, the transition to the image list screen 90B is performed. In addition, in a case in which the ¼ frame on which the representative image 37R of the future event image 37 is drawn is selected in the image list screen 90A, the transition to a first registration screen 105 (see FIG. 11) described below is performed without going through the image list screen 90B.

In the future event display region 93, in addition to the icon 96, a plurality of pieces of simple event information 100 are arranged up and down and displayed. The simple event information 100 can be scroll-displayed up and down. The simple event information 100 is information simply indicating the event information 25 from the image management server 10. The simple event information 100 includes the name of the event, a type of the registration event or the recommendation event, a star mark and the numerical value indicating the evaluation value, and the future event image 37. The image list screen 90B in which the simple event information 100 including the future event image 37 is arranged is an example of a "future event image list screen" according to the technology of the present disclosure.

Although the plurality of future event images 37 of the simple event information 100 are arranged in the row direction, the plurality of future event images 37 of the simple event information 100 are not arranged in the order of the acquisition date and time as in the images 22 of the past. Therefore, the plurality of future event images 37 of the simple event information 100 are handled in the same manner as the images 22 for one frame. The future event display region 93, which is replaced with the combination image display region 91 and the menu button display region 92, is positioned above the latest image 22N. As described above, the time-series arrangement direction of the images 22 as viewed as a whole is from the bottom to the top. That is, the future event display region 93, which is replaced with the combination image display region 91 and the menu button display region 92, is also an example of a "future region" according to the technology of the present disclosure.

The simple event information 100 is arranged in an order of arrival time of the event. More specifically, as shown by the one dot chain line arrow 98 and a one dot chain line arrow 101, the simple event information 100 is arranged from the bottom to the top in the order of the arrival time from the nearest to the farthest. Since the simple event information 100 includes the future event image 37 as described above, the future event images 37 are arranged in the order of the arrival time of the event by arranging the simple event information 100 in the order of the arrival time of the event. It should be noted that, in a case in which the event represented by the simple event information 100 is the registration event, the arrival time is the schedule date of the registration event. In a case in which the event represented by the simple event information 100 is the recommendation event, the arrival time is the recommendation time registered in the basic information 36. FIG. 10 shows an example in which the simple event information 100B (recommendation event image 37B) of the recommendation events, such as "Yamanaka lake park" and "Echigozawa ski resort", is arranged and displayed.

Figure 11:
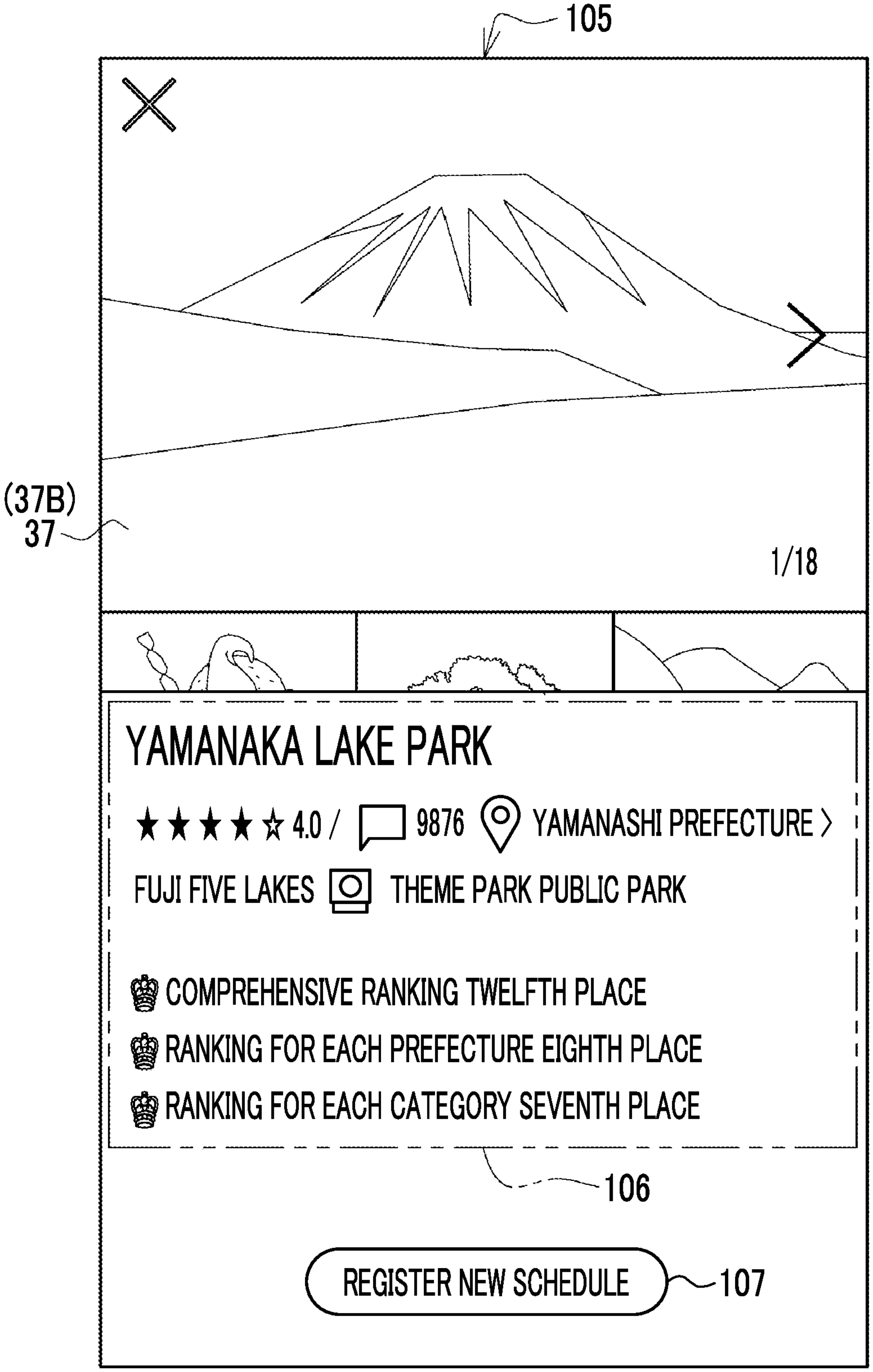
FIG. 11 is a diagram showing a first registration screen.

The simple event information 100 can be selected. In a case in which the simple event information 100B of the recommendation event is selected, the transition to the first registration screen 105 shown in FIG. 11 as an example is performed. In FIG. 11, the recommendation event images 37B are enlarged and displayed one by one in a feed-and-return possible manner in the first registration screen 105. In addition, detailed information 106 obtained by appropriately extracting the basic information 36 and the ranking information 38 is displayed in the first registration screen 105. Further, a new registration button 107 is provided in the first registration screen 105.

In a case in which the new registration button 107 is selected, a screen (not shown) for newly registering the recommendation event of which the detailed information 106 or the like is displayed in the first registration screen 105 as the registration event is displayed. In this screen, it is possible to input the schedule date of the registration event by using a GUI for date selection. It should be noted that FIG. 11 shows the first registration screen 105 for registering the recommendation event of "Yamanaka lake park".

Figure 12:
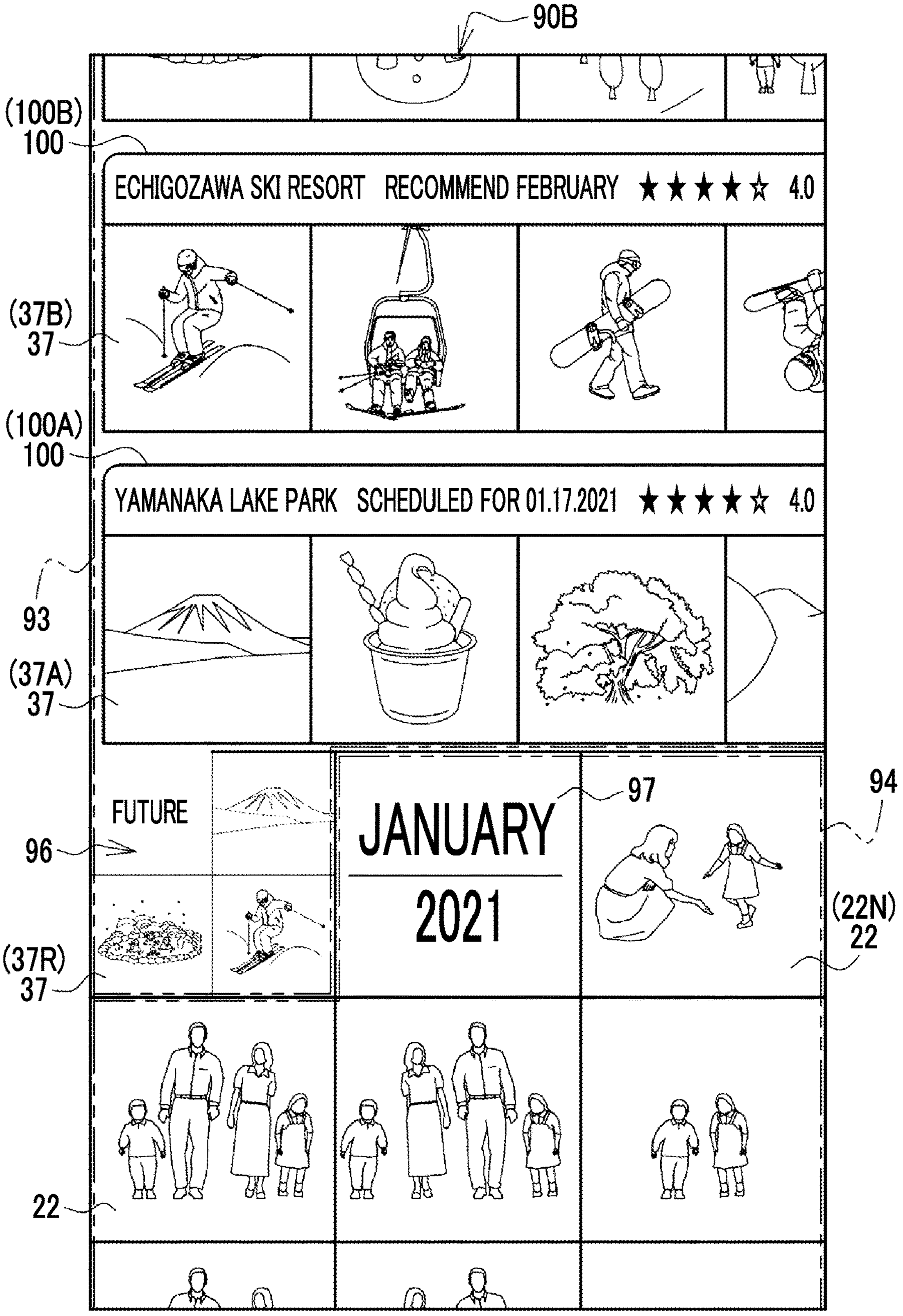
FIG. 12 is a diagram showing an image list screen including simple event information of a registration event.

FIG. 12 shows an example of the image list screen 90B including simple event information 100A of the registration event. The schedule date of the registration event is displayed in the simple event information 100A of the registration event. The display of the schedule date of the registration event makes a distinction from the simple event information 100B of the recommendation event in which a character "recommendation" is displayed. FIG. 12 shows an example in which the simple event information 100A of the registration event of "Yamanaka lake park" is displayed.

The user 13 goes to the place of the registration event on the schedule date and experiences the registration event. While experiencing the registration event, the user 13 captures the image 22 by using the camera function of the user terminal 11 and the like. The captured image 22 is displayed in the past image display region 94 as the image 22 of the past in the image list screens 90A and 90B.

Figure 13:
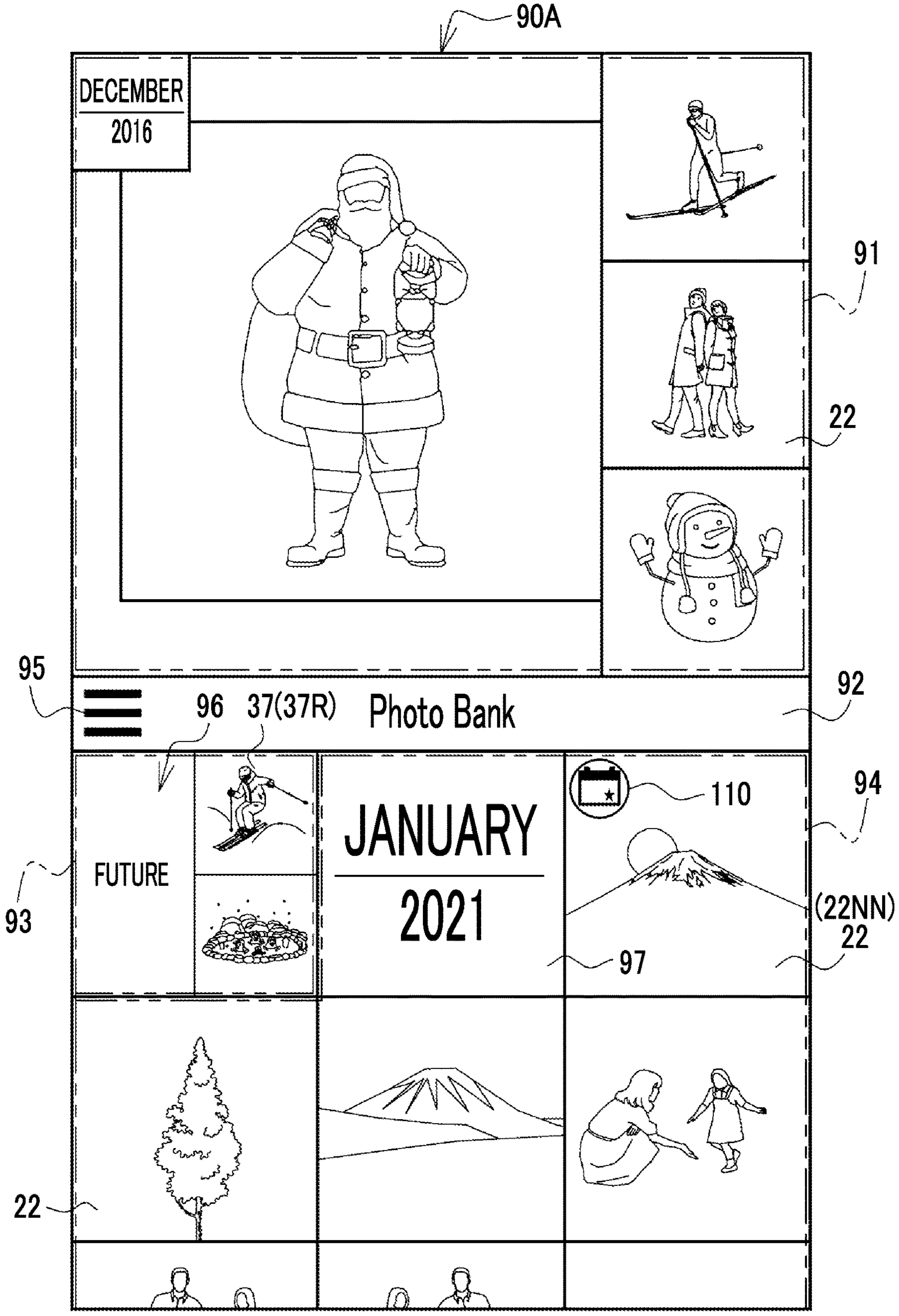
FIG. 13 is a diagram showing an image list screen in which an image captured by a user in the registration event experienced by the user is displayed.

FIG. 13 shows an example of the image list screen 90A in which the image 22, which is captured by the user 13 in the registration event experienced by the user 13, is displayed in the past image display region 94. A mark 110 is displayed on a latest image 22NN among the images 22 captured by the user 13 in the registration event experienced by the user 13. The mark 110 makes a distinction between the image 22 captured by the user in the registration event experienced by the user and the image 22 that is not related to the registration event. It should be noted that, instead of or in addition to the mark 110, the image 22 captured by the user 13 in the registration event experienced by the user 13 may be surrounded by a colored frame and displayed to be distinguishable from the image 22 that is not related to the registration event.

Figure 14:
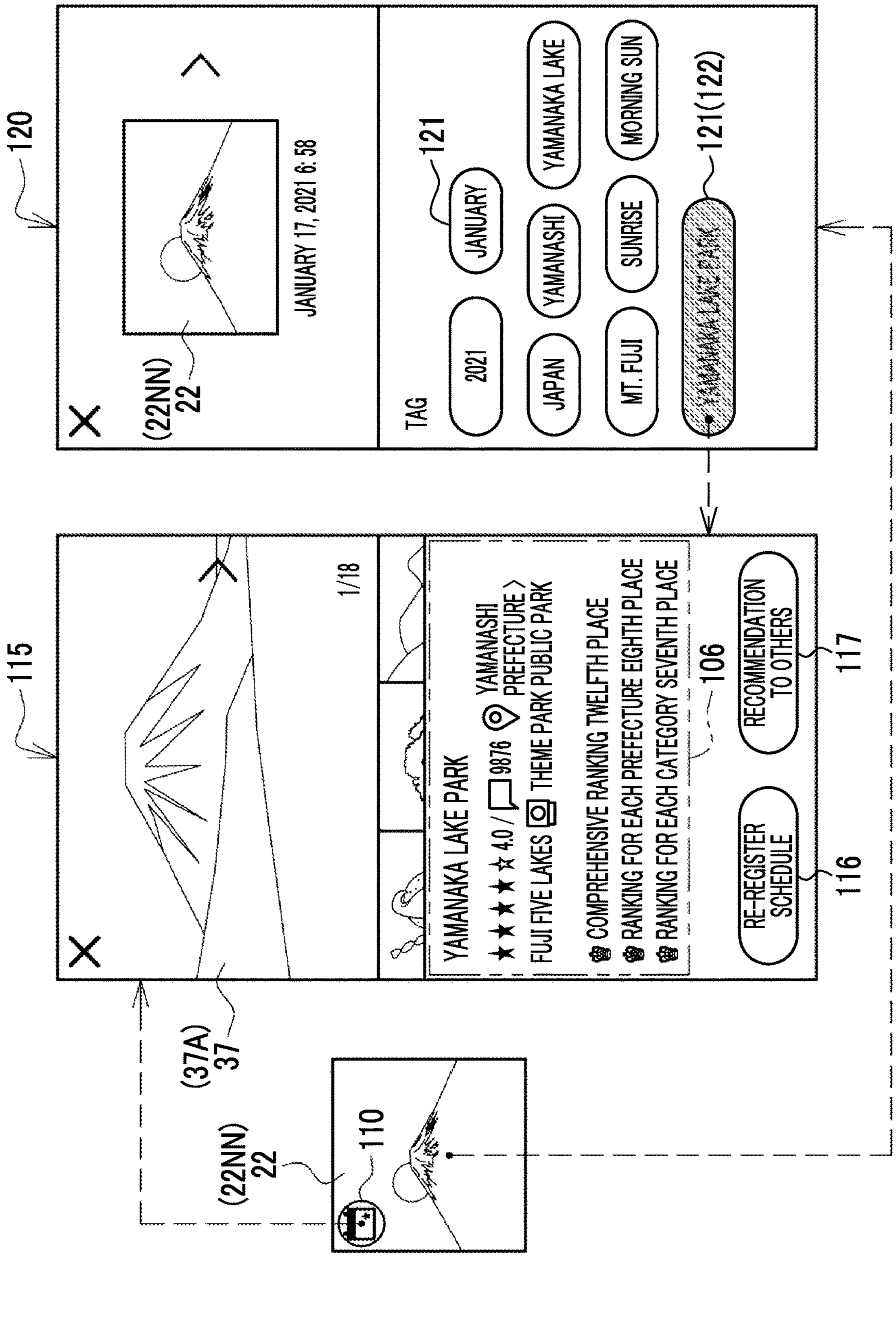
FIG. 14 is a diagram showing a second registration screen and an image display screen.

In a case in which the mark 110 is selected, the transition to a second registration screen 115 shown in the center of FIG. 14 as an example is performed. In the second registration screen 115, the registration event images 37A of the registration event experienced by the user 13 are enlarged and displayed one by one in a feed-and-return possible manner. In addition, the detailed information 106 of the registration event experienced by the user 13 is displayed in the second registration screen 115. Further, instead of the new registration button 107, the second registration screen 115 is provided with a re-registration button 116 and a recommendation-to-others button 117.

In a case in which the re-registration button 116 is selected, a screen (not shown) for re-registering the registration event experienced by the user 13 of which the detailed information 106 or the like are displayed in the second registration screen 115, as the registration event is displayed. In this screen, it is possible to input the schedule date of the registration event by using the GUI for date selection.

In addition, in a case in which the recommendation-to-others button 117 is selected, a transmission setting screen (not shown) is displayed. In the transmission setting screen, an acquaintance of the user 13 set in advance by the user 13 as a telephone contact or the like is displayed in a selectable manner. The browser control unit 75 transmits the registration event information 25A of the registration event experienced by the user 13 of which the detailed information 106 or the like is displayed in the second registration screen 115 to the user terminal 11 of the acquaintance of the user 13 selected in the transmission setting screen. The acquaintance of the user 13 is, for example, a family member, a relative, a lover, a friend, a colleague at work, and the like of the user 13. The second registration screen 115 is an example of a "registration screen" according to the technology of the present disclosure. The re-registration button 116 is an example of a "button for re-registering the registration event as a schedule" according to the technology of the present disclosure. In addition, the recommendation-to-others button 117 is an example of a "button for recommending the registration event to an acquaintance of the user" according to the technology of the present disclosure.

Further, in a case in which the image 22 (image 22NN in which the mark 110 is displayed) captured by the user 13 is selected in the registration event experienced by the user 13 in the image list screen 90A or 90B, the transition to an image display screen 120 shown on the right side of FIG. 14 as an example is performed. The selected image 22NN is enlarged and displayed in the image display screen 120. In addition, a tag 121 assigned to the image 22NN is displayed in the image display screen 120. The tag 121 includes a word ("2021" and "January") representing the imaging year and month of the image 22NN, a word ("Japan", "Yamanashi", and "Yamanaka lake") representing the imaging location, and a word ("Mt. Fuji", "sunrise", "morning sun") representing a subject that appears in the image 22NN. The tag 121 representing the imaging year and month is extracted from the imaging date and time of the image 22NN. The tag 121 representing the imaging location is extracted from global positioning system (GPS) information of the image 22NN. The tag 121 representing the subject that appears in the image 22NN is extracted by performing image analysis on the image 22NN.

Also, the tag 121 includes the name of the registration event. The name of the registration event is extracted by collating the schedule date of the registration event with the imaging date and time of the image 22NN, and referring to the GPS information of the image 22NN. A link 122 is assigned to the tag 121 of the name of the registration event as shown by hatching. In a case in which the tag 121 (link 122) of the name of the registration event is selected, the transition to the second registration screen 115 in which the registration event image 37A or the like of the registration event experienced by the user 13 is displayed is performed. That is, the link 122 is an example of a "link for accessing the registration event image of the registration event experienced by the user" according to the technology of the present disclosure. As described above, the second registration screen 115 is displayed in the case in which the mark 110 is selected, and also in the case in which the tag 121 (link 122) of the name of the registration event is selected.

Next, an action with the configuration described above will be described with reference to the flowchart shown in FIG. 15 as an example. As shown in FIG. 6, the CPU 42A of the image management server 10 functions as the request reception unit 55, the attribute information acquisition unit 56, the event information acquisition unit 57, and the distribution control unit 58. Also, the CPU 42B of the user terminal 11 functions as the browser control unit 75 as shown in FIG. 8. The browser control unit 75 is constructed with the instruction reception unit 77, the request transmission unit 78, a screen generation unit 79, and the screen output unit 80.

In a case in which the instruction to start up the image viewing AP 70 is received by the instruction reception unit 77 (YES in step ST100), the event information distribution request 26 is transmitted from the request transmission unit 78 to the image management server 10 (step ST110).

In the image management server 10 that receives the event information distribution request 26, as shown in FIGS. 6 and 7, the event information acquisition unit 57 acquires the event information 25 according to the event information distribution request 26. The event information 25 includes the registration event information 25A of the registration event registered as the schedule by the user 13 and/or the recommendation event information 25B of the recommendation event recommended to the user 13. The recommendation event includes the event selected based on the attribute of the user 13.

The event information 25 is output from the event information acquisition unit 57 to the distribution control unit 58. The event information 25 is distributed by the distribution control unit 58 to the user terminal 11 that is the transmission source of the event information distribution request 26.

In the user terminal 11, the event information 25, which is distributed from the distribution control unit 58 of the image management server 10, is received by the screen generation unit 79 (step ST120). The screen generation unit 79 generates the image list screen 90A shown in FIG. 9 and the like. In this case, the screen generation unit 79 disposes the icon 96 on which the representative image 37R of the future event image 37 is displayed in the future event display region 93 which is a future region in the time-series arrangement direction with respect to the latest image 22N among the images 22 of the past (step ST130).

Screen data of the image list screen 90A is output from the screen generation unit 79 to the screen output unit 80. The screen output unit 80 displays the image list screen 90A on the display 44B based on the screen data of the image list screen 90A (step ST140).

In a case in which the icon 96 is selected in the image list screen 90A (YES in step ST150), the screen generation unit 79 generates the image list screen 90B including the simple event information 100 shown in FIG. 10 and the like. In this case, the screen generation unit 79 arranges the simple event information 100 and the future event image 37 in the order of the arrival time of the event (step ST160).

Screen data of the image list screen 90B is output from the screen generation unit 79 to the screen output unit 80. The screen output unit 80 displays the image list screen 90B on the display 44B based on the screen data of the image list screen 90B (step ST170).

As described above, the CPU 42B of the user terminal 11 comprises the screen generation unit 79 and the screen output unit 80. The screen generation unit 79 generates the image list screens 90A and 90B in which the images 22 possessed by the user 13 are arranged in time series. In this case, the screen generation unit 79 disposes the future event image 37, which is the image of the event of the future related to the user 13, in the future event display region 93, which is the future region in the time-series arrangement direction with respect to the latest image 22N among the images 22. The screen output unit 80 displays and outputs the image list screens 90A and 90B to the display 44B.

A time axis from the past to the present and to the future is expressed in a natural form by a disposition relationship between the image 22 of the past and the future event image 37. Therefore, the user 13 can think about the event of the future on the extension line of looking back on the past memories by the image 22 of the past without dividing the thought. In addition, the future event image 37 allows the user 13 to more embody his or her thoughts about the event of the future, such as where to go next or what kind of pictures to capture in the next place. Therefore, the user 13 can more specifically think about the event of the future while looking back on the past memories. Since it is expected that the user 13 actively participates in the event of the future and captures many pictures, the significance of presence of the image management server 10 can be enhanced as a result.

The screen generation unit 79 disposes, in a selectable manner, the icon 96 on which the future event image 37 (representative image 37R) is displayed in the future event display region 93. Then, in a case in which the icon 96 is selected, the image list screen 90B in which the future event images 37 are arranged is generated. The screen output unit 80 displays and outputs the image list screen 90B to the display 44B. Therefore, in the image list screen 90A before the icon 96 is selected, an original purpose of viewing the image 22 of the past can be sufficiently achieved.

The user 13 can know an outline of the future event image 37 by the icon 96. In addition, the user 13 can know the whole aspect of the future event image 37 from the image list screen 90B. In this way, by stepping up a display form from the outline to the whole aspect, it is possible to gradually raise the expectations of the user 13 for the event of the future.

The screen generation unit 79 arranges the future event images 37 in the order of the arrival time of the event in the image list screen 90B. Therefore, the time axis from the past to the present and to the future can be expressed more clearly. The user 13 can more seamlessly connect looking back on the past memories by the image 22 of the past and thinking about the event of the future.

The future event image 37 is at least one of the registration event image 37A related to the registration event registered as the schedule by the user 13, or the recommendation event image 37B related to the recommendation event recommended to the user 13. The registration event image 37A serves as a reference for a picture captured by the user 13 in the registration event. The recommendation event image 37B is a good help for the user 13 to intuitively image the recommendation event.

The screen generation unit 79 displays the mark 110 on the image 22 (22NN) captured by the user 13 in the registration event experienced by the user 13, so that the mark 110 is displayed to be distinguishable from the image 22 that is not related to the registration event. Therefore, the image 22 captured by the user 13 in the registration event experienced by the user 13 can be seen at a first glance. It is possible to easily remind the user 13 of the pleasant memories of the experienced registration event, and it is possible to increase the motivation to go to the event again. As a result, a frequency of use of the image viewing AP 70 is increased.

In a case in which the image 22 (22NN) captured by the user 13 in the registration event experienced by the user 13 is selected, the screen generation unit 79 generates the image display screen 120 including the selected image 22 and the link 122 for accessing the registration event image 37A of the registration event experienced by the user 13. The screen output unit 80 displays and outputs the image display screen 120 to the display 44B. Therefore, it is possible to easily access the registration event image 37A of the registration event experienced by the user, while viewing the image 22 captured by the user 13 in the registration event experienced by the user 13.

The screen generation unit 79 generates the second registration screen 115 including the registration event image 37A of the registration event experienced by the user, the re-registration button 116, and the recommendation-to-others button 117. The screen output unit 80 displays and outputs the second registration screen 115 to the display 44B. Therefore, the user 13 can easily re-register the favorite event and recommend the favorite event to the acquaintance. In a case in which a business model in which the user 13 receives the consideration by registering the event is considered, it is possible to contribute to the increase in sales.

The second registration screen 115 can be displayed even in the middle of the experience of the registration event. The registration event image 37A is displayed in the second registration screen 115. Therefore, in a case in which the second registration screen 115 is displayed in the middle of the experience of the registration event, it is possible to check the registration event image 37A for forgetting to capture a picture or the like.

The recommendation event includes the event selected based on the attribute of the user 13. For this reason, it is possible to increase a probability that the user 13 will register the recommendation event as the schedule, as compared with a case in which an event having no connection or relationship is recommended to the user 13. In a case in which the business model in which the user 13 receives the consideration by registering the event is considered, it is possible to contribute to the increase in sales.

Figure 16:
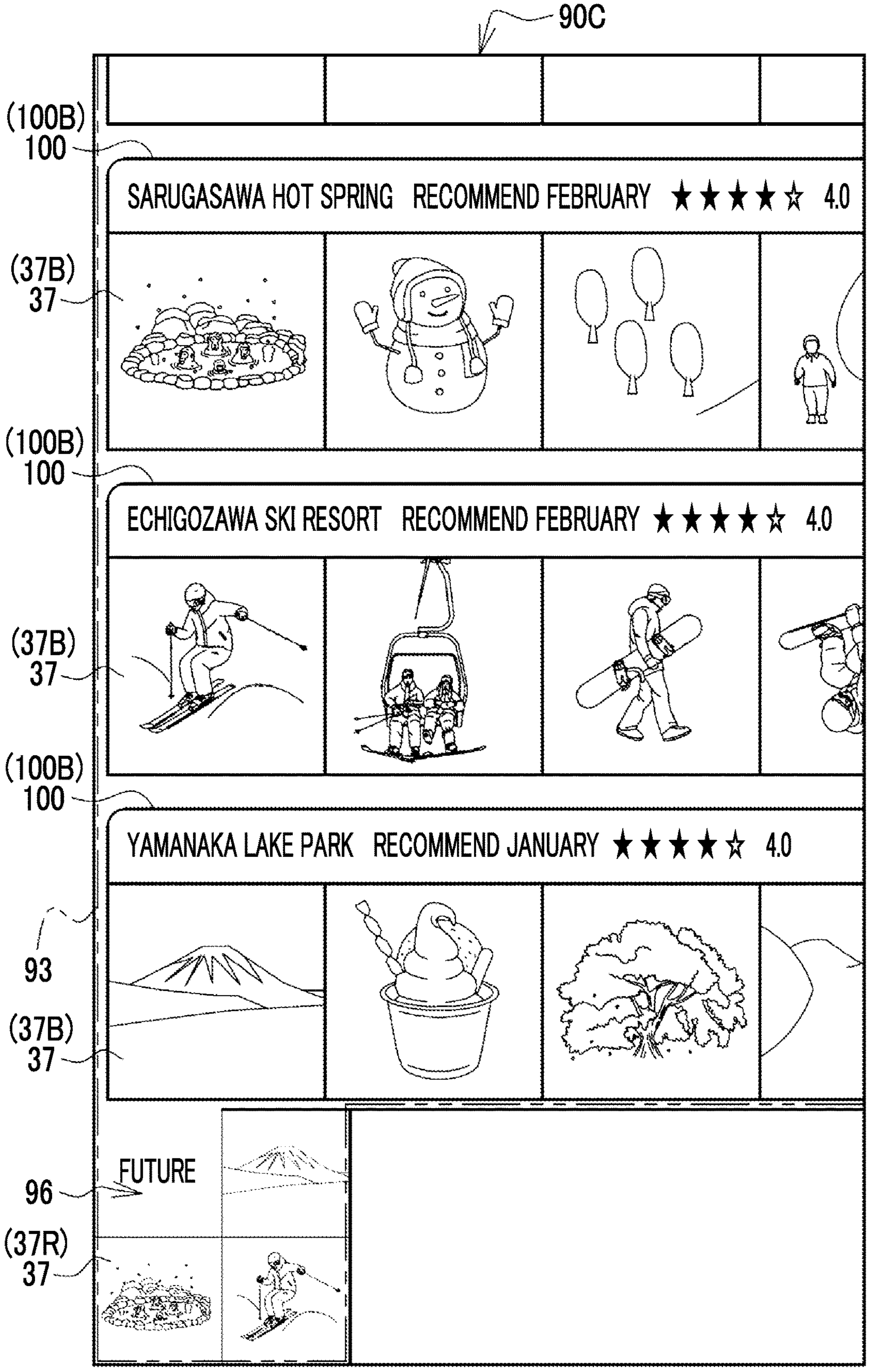
FIG. 16 is a diagram showing another example of the image list screen.

It should be noted that, in the image list screen 90B after the icon 96 is selected, the combination image display region 91 and the menu button display region 92 disappear, and the past image display region 94 is left, but the technology of the present disclosure is not limited to this. As an example, as in an image list screen 90C shown in FIG. 16, the past image display region 94 may also disappear, and the past image display region 94 may also be replaced with the future event display region 93. FIG. 16 shows an example in which the simple event information 100B (recommendation event image 37B) of “Sarugasawa hot spring” is displayed in addition to “Yamanaka lake park” and “Echigozawa ski resort” shown in FIG. 10.

Figure 17:
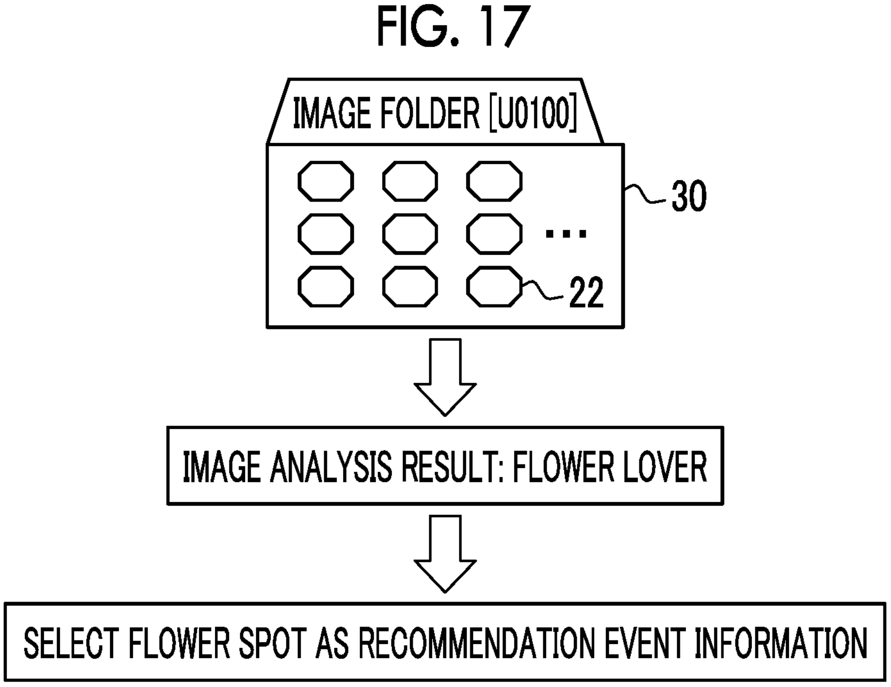
FIG. 17 is a diagram showing an aspect in which a recommendation event is selected based on an image analysis result of an image possessed by the user.
Figure 18:
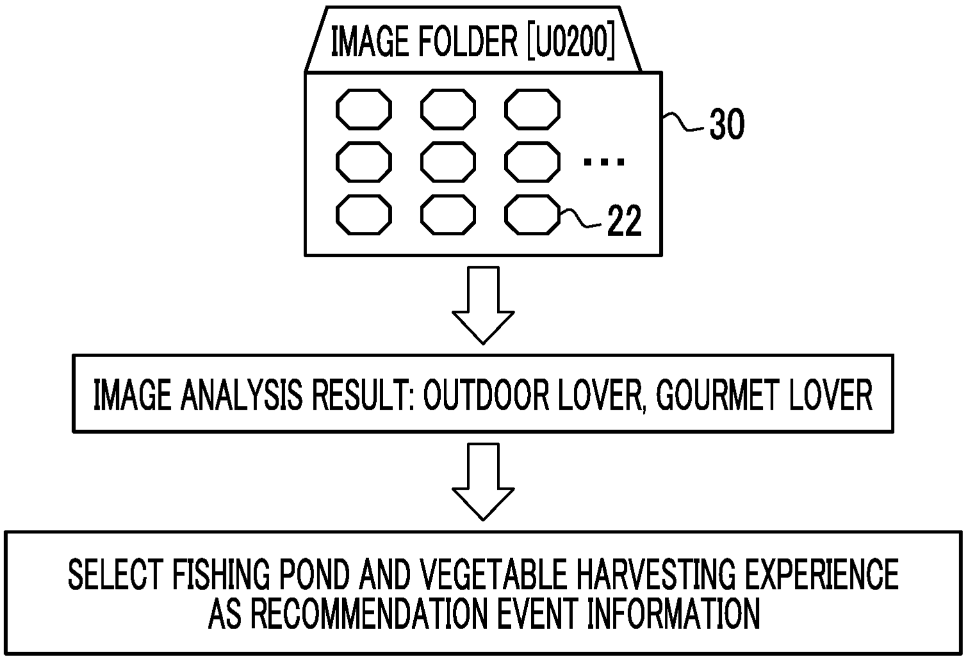
FIG. 18 is a diagram showing another example of the aspect in which the recommendation event is selected based on the image analysis result of the image possessed by the user.

As an example, the aspects shown in FIGS. 17 and 18 may be adopted. That is, the CPU 42A of the image management server 10 performs the image analysis on the image 22 possessed by the user 13 stored in the image folder 30, and selects the recommendation event based on an image analysis result.

FIG. 17 shows an example in which, in a case in which the image analysis result indicating that the user 13 is a flower lover is obtained such that a flower appears in a relatively large number of images 22, a flower spot is selected as the recommendation event information 25B. FIG. 18 shows an example in which, in a case in which the image analysis result indicating that the user 13 is an outdoor lover and a gourmet lover is obtained such that the outdoors and food appear in a relatively large number of images 22, fishing pond and vegetable harvesting experience are selected as recommendation event information 25B. In this way, it is possible to recommend an event that matches the preference of the user 13. It should be noted that, also in the aspects shown in FIGS. 17 and 18, the attributes related to the preference of the user 13, such as the flower lover and the gourmet lover, are obtained as the image analysis results. Therefore, there is no change that the recommendation event is selected based on the attribute of the user 13.

Figure 19:
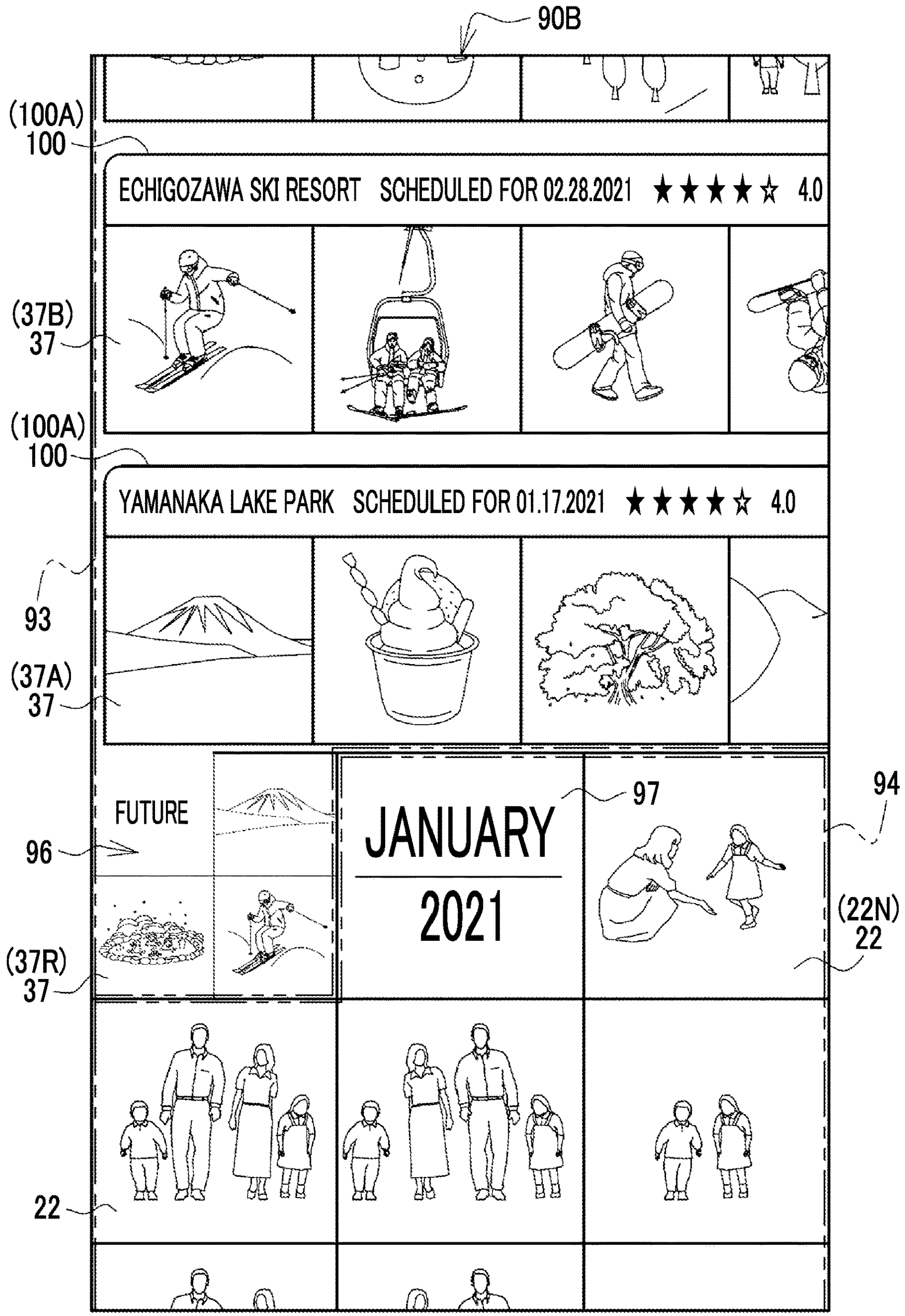
FIG. 19 is a diagram showing still another example of the image list screen.

There is no need to have the recommendation event. For example, the user 13 may search for desired event information 25 in the event information DB 24 by himself/herself, and may register the event of the searched event information 25 as the schedule. In this case, as shown in FIG. 19 as an example, the image list screen 90B does not display the simple event information 100B (recommendation event image 37B) of the recommendation event, and displays only the simple event information 100A (registration event image 37A) of the registration event.

The image viewing AP 70 and a general-purpose scheduler AP may be linked. That is, the event registered as the schedule by the user 13 in the scheduler AP may be notified to the image viewing AP 70 as the registration event.

Figure 20:
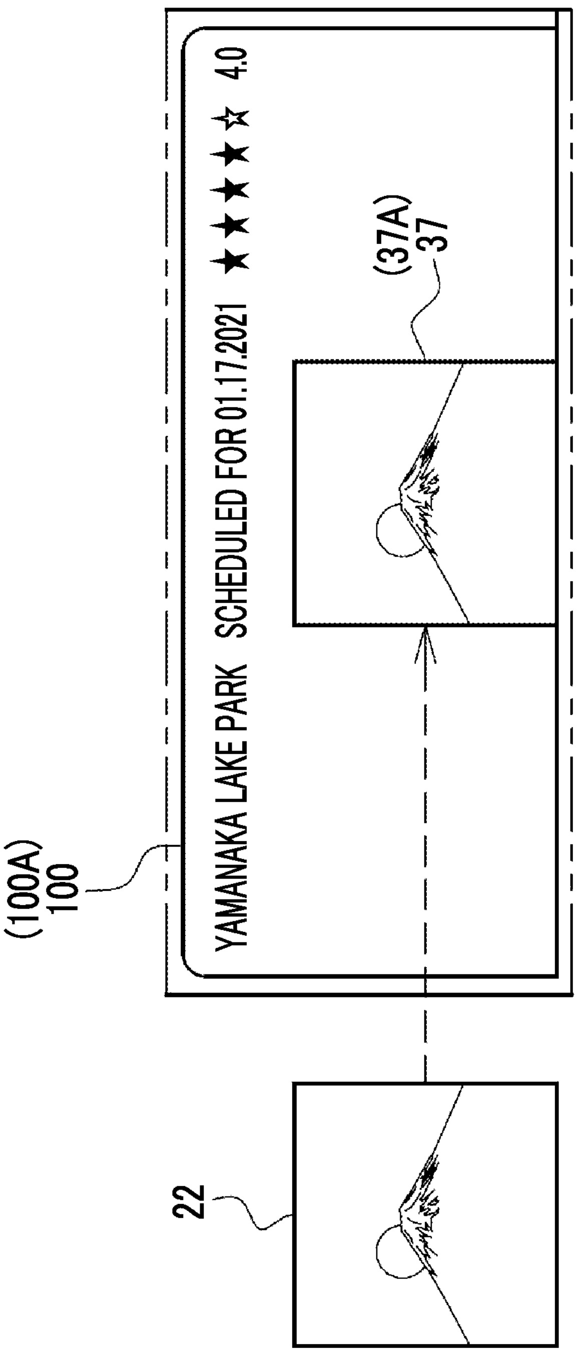
FIG. 20 is a diagram showing an aspect in which an image captured in the past by the user is used as a future event image.

The future event image 37 is not limited to the image captured by the person in charge of the event or the organizer, or the image captured by another user 13 who has experienced the event. The future event image 37 may be searched from images on the Internet using the name of the event or the like as a search keyword. Further, as shown in FIG. 20 as an example, the image 22 captured in the past by the user 13 who has registered the event may be selected by himself/herself, and may be used as the future event image 37 (registration event image 37A). Further, an image selected from among the images on the Internet by the user 13 who has registered the event may be used as the future event image 37.

In the embodiment described above, the event information distribution request 26 is transmitted from the user terminal 11 to the image management server 10 according to the instruction to start up the image viewing AP 70, but the technology of the present disclosure is not limited to this. The event information distribution request 26 may be transmitted from the user terminal 11 to the image management server 10 at time set in advance. Examples of the time set in advance include, for example, every Thursday or Friday at 20:00 near the holiday, or conversely, every Monday at 20:00 after the holiday, and at the beginning or end of the month.

In a case in which the recommendation event information 25B distributed from the image management server 10 is received, a notification message to the effect that the recommendation event information 25B is received may be displayed in a home screen of the user terminal 11. The notification message may include the recommendation event image 37B. In addition, in a case in which the notification message is selected and opened, the first registration screen 105 may be immediately displayed and output to the display 44B without displaying the image list screen 90A or the like.

The frame 97 representing the current year and month is disposed between the latest image 22N among the images 22 of the past and the icon 96, but the frame 97 may not be provided. The latest image 22N may be disposed at the position of the frame 97. Alternatively, the latest image 22N may be displayed as a watermark behind the frame 97.

A favorite button may be provided in the first registration screen 105 and the second registration screen 115. In addition, a configuration may be adopted in which the events for which the favorite button is selected can be collectively viewed by the user 13 later, such as collectively displaying the events in a favorite event list screen.

A button having the same function as the recommendation-to-others button 117 of the second registration screen 115 may also be provided in the first registration screen 105. In this manner, the information on the recommendation event can be shared between the user 13 and the acquaintance of the user 13, and it is possible to determine whether or not to newly register the recommendation event as the schedule while listening to the opinion of the acquaintance.

A recommendation event may be selected for each itinerary, such as a day trip, one night, or two nights or more, and the simple event information 100B of the recommendation event may be displayed for each itinerary in the image list screen 90B. In addition, the recommendation event may be selected based on the evaluation value and/or the total number of word-of-mouth communication, such that the evaluation value is equal to or greater than a threshold value and the total number of word-of-mouth communication is equal to or greater than a threshold value. Further, the recommendation event may be randomly selected regardless of the attribute of the user 13, the evaluation value, the total number of word-of-mouth communication, and the like. Presenting a surprisingly recommendation event can excite the interest of the user 13 who is tired of a similar event.

Each of the screens described as an example in the embodiment described above is a vertically long screen, but of course, a horizontally long screen may be used. The management entity of the image management server 10 and the image DB server 20 and the management entity of the event information DB server 21 may be the same as or may be different from each other. In order to know the attribute of the user 13 in more detail, the user 13 may be asked to answer a questionnaire, such as a frequently visited place, a recent interest, a hobby, and a preference.

The image management server 10 may be responsible for a part or all of the functions of each processing unit of the user terminal 11, and the image management server 10 may function as the information processing apparatus according to the technology of the present disclosure. Specifically, various screens, such as the image list screen 90A, are generated in the image management server 10, and are distributed and output to the user terminal 11 in a format of screen data for web distribution created by a markup language such as extensible markup language (XML). In this case, the browser control unit 75 of the user terminal 11 represents various screens to be displayed on the web browser based on the screen data and displays various screens on the display 44B. It should be noted that another data description language, such as Javascript (registered trademark) object notation (JSON), may be used instead of the XML.

The user terminal 11 that transmits the image 22 to the image management server 10 and the user terminal 11 that receives the distribution of the event information 25 from the image management server 10 may be separate from each other. For example, in a case in which there are a plurality of user terminals 11 having the account of the same user 13, the image 22 may be transmitted from one user terminal 11 to the image management server 10, and the event information 25 may be distributed from the other image management server 10 to the other user terminal 11.

It is possible to modify a hardware configuration of the computer constituting the image management server 10 in various ways. For example, the image management server can be configured by using a plurality of computers separated as hardware for the purpose of improving processing ability and reliability. For example, two computers are responsible for the functions of the request reception unit 55 and the attribute information acquisition unit 56, and the functions of the event information acquisition unit 57 and the distribution control unit 58 in a distributed manner. In this case, the image management server 10 is configured by using two computers. Also, the image management server 10, the image DB server 20, and the event information DB server 21 may be integrated into one server.

As described above, the hardware configuration of the computer of the image management server 10 can be appropriately changed according to the required performance, such as the processing ability, the safety, and the reliability. Further, it is also needless to say that, in addition to the hardware, the APs, such as the operation program 50 and the image viewing AP 70, can also be duplicated or distributed and stored in a plurality of storages for the purpose of securing the safety and the reliability.

In the embodiment described above, for example, as a hardware structure of processing units that execute various types of processing, such as the request reception unit 55, the attribute information acquisition unit 56, the event information acquisition unit 57, the distribution control unit 58, and the browser control unit 75 (the instruction reception unit 77, the request transmission unit 78, the screen generation unit 79, and the screen output unit 80), the various processors described below can be used. The various processors include, for example, the CPUs 42A and 42B which are general-purpose processors executing software (operation program 50 and image viewing AP 70) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to execute specific processing.

One processing unit may be configured by using one of these various processors, or may be configured by using a combination of two or more processors of the same type or different types (for example, a combination of a plurality of FPGAs and/or a combination of a CPU and an FPGA). In addition, a plurality of the processing units may be configured by using one processor.

As an example in which the plurality of processing units are configured by using one processor, first, as represented by a computer such as a client and a server, there is a form in which one processor is configured by using a combination of one or more CPUs and software and this processor functions as the plurality of processing units. Second, as represented by a system on chip (SoC) or the like, there is a form in which a processor that realizes the functions of the entire system including the plurality of processing units with one integrated circuit (IC) chip is used. In this way, as the hardware structure, the various processing units are configured by using one or more of the various processors described above.

Further, more specifically, an electric circuit (circuitry) in which circuit elements, such as semiconductor elements, are combined can be used as the hardware structure of the various processors.

In the technology of the present disclosure, the above-described various embodiments and/or various modification examples can be appropriately combined. Further, it is needless to say that the present disclosure is not limited to the above-described embodiment and various configurations can be adopted without departing from the scope of the technology of the present disclosure. Further, the technology of the present disclosure extends to a storage medium that non-transitorily stores a program in addition to the program.

The contents described and shown above are detailed descriptions of portions according to the technology of the present disclosure and are merely examples of the technology of the present disclosure. For example, the above description of the configurations, functions, actions, and effects is a description of an example of the configurations, functions, actions, and effects of the portions according to the technology of the present disclosure. Accordingly, it goes without saying that unnecessary portions may be deleted, new elements may be added, or replacement may be made with respect to the contents described and shown above without departing from the scope of the technology of the present disclosure. In addition, in order to avoid complication and facilitate understanding of portions according to the technology of the present disclosure, description related to common technical knowledge or the like that does not need to be particularly described for enabling implementation of the technology of the present disclosure is omitted in the contents described and shown above.

In the present specification, "A and/or B" has the same meaning as "at least one of A or B". That is, "A and/or B" means that only A may be used, only B may be used, or a combination of A and B may be used. In addition, in the present specification, in a case in which three or more matters are expressed by being connected by "and/or", the same concept as "A and/or B" is applied.

All documents, patent applications, and technical standards described in the present specification are incorporated in the present specification by reference to the same extent as a case in which each individual publication, patent application, or technical standard is specifically and individually indicated to be incorporated by reference.

What is claimed is:

1. An information processing apparatus comprising:
- a processor; and
- a memory connected to or built in the processor,
- wherein the processor is configured to:
- in a case in which an image list screen in which images possessed by a first user are arranged in time series is generated, dispose a future event image, which is an image of an event of future related to the first user and which is captured by an organizer of the event or a second user other than the first user, in a future region in a time-series arrangement direction with respect to a latest image among the images; and
- output the generated image list screen,
- wherein the future event image includes a recommendation event image related to a recommendation event recommended to the first user, and
- wherein the recommendation event includes an event that is selected based on an attribute of the first user, and that satisfies ranking condition for ranking related to an age, a gender, a family structure, or a residential area of the first user.

2. The information processing apparatus according to claim 1,
- wherein the processor is configured to:
- dispose an icon on which the future event image is displayed, in the future region in a selectable manner;
- in a case in which the icon is selected, generate a future event image list screen in which the future event images are arranged; and
- output the generated future event image list screen.

3. The information processing apparatus according to claim 2,
- wherein the processor is configured to:
- arrange the future event images in an order of arrival time of the event in the future event image list screen.

4. The information processing apparatus according to claim 1,
- wherein the future event image includes
- a registration event image related to a registration event registered as a schedule by the first user.

5. The information processing apparatus according to claim 4, wherein the processor is configured to:

display, in the image list screen, an image captured by the first user in the registration event experienced by the first user to be distinguishable from an image that is not related to the registration event.

6. The information processing apparatus according to claim 5, wherein the processor is configured to:

in a case in which the image captured by the first user in the registration event experienced by the first user is selected in the image list screen, generate an image display screen including the selected image and a link for accessing the registration event image of the registration event experienced by the first user; and output the generated image display screen.

7. The information processing apparatus according to claim 4, wherein the processor is configured to:

generate a registration screen including the registration event image of the registration event experienced by the first user, a button for re-registering the registration event as a schedule, and a button for recommending the registration event to an acquaintance of the first user; and output the generated registration screen.

8. An operation method of an information processing apparatus, the method comprising:

disposing, in a case in which an image list screen in which images possessed by a first user are arranged in time series is generated, a future event image, which is an image of an event of future related to the first user and which is captured by an organizer of the event or a second user other than the first user, in a future region in a time-series arrangement direction with respect to a latest image among the images; and outputting the generated image list screen, wherein the future event image includes a recommendation event image related to a recommendation event recommended to the first user, and wherein the recommendation event includes an event that is selected based on an attribute of the first user, and that satisfies ranking condition for ranking related to an age, a gender, a family structure, or a residential area of the first user.

9. A non-transitory computer-readable storage medium storing an operation program of an information processing apparatus for causing a computer to execute a process comprising:

disposing, in a case in which an image list screen in which images possessed by a first user are arranged in time series is generated, a future event image, which is an image of an event of future related to the first user and which is captured by an organizer of the event or a second user other than the first user, in a future region in a time-series arrangement direction with respect to a latest image among the images; and outputting the generated image list screen, wherein the future event image includes a recommendation event image related to a recommendation event recommended to the first user, and wherein the recommendation event includes an event that is selected based on an attribute of the first user, and that satisfies ranking condition for ranking related to an age, a gender, a family structure, or a residential area of the first user.

* * * * *